United States Patent
Cho et al.

(10) Patent No.: US 11,615,760 B2
(45) Date of Patent: Mar. 28, 2023

(54) CONTROLLING OF DEVICE BASED ON USER RECOGNITION UTILIZING VISION AND SPEECH FEATURES

(71) Applicant: LG ELECTRONICS INC., Seoul (KR)

(72) Inventors: Changseok Cho, Seoul (KR); Woonghee Park, Seoul (KR); Hyunok Lee, Seoul (KR); Mansoo Sin, Seoul (KR); Sanghoon Song, Seoul (KR); Sangkuk Jeon, Seoul (KR); Cheol Kang, Seoul (KR)

(*) Notice: Subject to any disclaimer, the term of this patent is extended or adjusted under 35 U.S.C. 154(b) by 0 days.

(21) Appl. No.: 17/101,770

(22) Filed: Nov. 23, 2020

(65) Prior Publication Data
US 2021/0158773 A1    May 27, 2021

(30) Foreign Application Priority Data
Nov. 22, 2019 (KR) .................. 10-2019-0151242

(51) Int. Cl.
*G09G 5/00* (2006.01)
*G06N 3/08* (2006.01)
*G06N 3/04* (2006.01)
*G06F 3/01* (2006.01)
(Continued)

(52) U.S. Cl.
CPC .......... *G09G 5/003* (2013.01); *G06F 1/3231* (2013.01); *G06F 3/011* (2013.01); *G06F 3/017* (2013.01);
(Continued)

(58) Field of Classification Search
CPC ............ G09G 5/003; G09G 2330/026; G09G 2330/027; G09G 2330/021; G09G 2330/022; G06F 1/3203; G06F 1/3206; G06F 1/3231; G06F 3/011; G06F 3/012; G06F 3/013; G06F 3/017; G06F 3/16; G06F 3/167; G06F 21/32; G06F 2203/011; G06F 2203/0381; G06K 9/00221–00389; G06K 9/62227; G06K 9/6256; G06K 9/6288–6293; G06K 9/00536; G06K 9/00597–00711; G06K 2009/328; G06K 2009/00738; G06N 3/02–049; G06N 3/08–088; G10L 15/08; G10L 15/16; G10L 15/24; G10L 15/25; G10L 15/30;
(Continued)

(56) References Cited

U.S. PATENT DOCUMENTS 6,526,159 B1* 2/2003 Nickerson ............ G06F 1/3203
                                                382/117
10,650,278 B1* 5/2020 Ho ........................ G06K 9/34
(Continued)

*Primary Examiner* — Keith L Crawley
(74) *Attorney, Agent, or Firm* — Lee, Hong, Degerman, Kang & Waimey PC

(57) ABSTRACT

An artificial intelligence-based control method is disclosed. In an artificial intelligence-based control method according to an exemplary embodiment of the present disclosure, when a user approaches within a set sensing range of a device, the device may capture a user image and predict whether the user has an intent to use the device by using motion features included in the captured image. An AI control method of the present disclosure may be associated with an artificial intelligent module, an unmanned aerial vehicle (UAV), a robot, an augmented reality (AR) device, a virtual reality (VR) device, a 5G service-related device, etc.

12 Claims, 21 Drawing Sheets

(51) Int. Cl.
*G06F 3/16* (2006.01)
*G10L 17/18* (2013.01)
*G10L 25/51* (2013.01)
*G06F 1/3231* (2019.01)
*G06V 40/10* (2022.01)

(52) U.S. Cl.
CPC ............ *G06F 3/16* (2013.01); *G06N 3/0454* (2013.01); *G06N 3/08* (2013.01); *G06V 40/10* (2022.01); *G10L 17/18* (2013.01); *G10L 25/51* (2013.01); *G09G 2330/027* (2013.01)

(58) Field of Classification Search
CPC ... G10L 17/00–26; G10L 25/30; G10L 25/51; G10L 25/57; G10L 2015/226; G10L 2015/227; G06V 40/10; G06V 40/16–28; G06V 40/70
See application file for complete search history.

(56) References Cited

U.S. PATENT DOCUMENTS

| | | | |
|---|---|---|---|
| 2004/0175020 A1* | 9/2004 | Bradski | G06F 1/3203 382/103 |
| 2010/0245330 A1* | 9/2010 | Mertens | G09G 3/3406 345/212 |
| 2011/0050656 A1* | 3/2011 | Sakata | G06F 3/011 345/204 |
| 2013/0169410 A1* | 7/2013 | Amselem | G05B 1/01 340/5.52 |
| 2014/0208145 A1* | 7/2014 | Piccolotto | G09G 3/20 713/324 |
| 2016/0267577 A1* | 9/2016 | Crowder | G06F 3/011 |
| 2019/0392195 A1* | 12/2019 | Maeng | G06F 3/04842 |
| 2020/0021886 A1* | 1/2020 | Kawk | H04N 21/44218 |
| 2021/0271091 A1* | 9/2021 | Xu | G06F 3/013 |

* cited by examiner

| | 0.1s | 0.2s | 0.3s | 0.4s | 0.5s | 0.6s | 0.7s |
|---|---|---|---|---|---|---|---|
| ● Feature 1 | 10 | 9 | 8 | 7 | 6 | 5 | 4 |
| ■ Feature 2 | 7 | 6 | 5 | 4 | 3 | 2 | 2 |
| ▲ Feature 3 | 7 | 6 | 5 | 4 | 3 | 2 | 2 |

* Position values with respect to Y axis

Shifts in feature points
⇩
Result : User is sitting down

CONTROLLING OF DEVICE BASED ON USER RECOGNITION UTILIZING VISION AND SPEECH FEATURES

CROSS-REFERENCE TO RELATED APPLICATION(S)

Pursuant to 35 U.S.C. § 119(a), this application claims the benefit of earlier filing date and right of priority to Korean Patent Application No. 10-2019-0151242, filed on Nov. 22, 2019, the contents of which are hereby incorporated by reference herein in its entirety.

BACKGROUND OF THE DISCLOSURE

Field of the Disclosure

The present disclosure relates to the controlling of a device based on user recognition.

Related Art

Artificial intelligence (AI) system is a computer system that implements human-level intelligence, and unlike the existing rule-based smart system, machines learn, judge and become smart on their own. As artificial intelligence systems become more recognizable and more accurate in understanding user tastes, existing rule-based smart systems are gradually being replaced by deep learning-based artificial intelligence systems.

Artificial intelligence technology includes machine learning (deep learning) and element technology that utilizes machine learning.

Machine learning is an algorithm technology in which a machine classifies/learns features from input data by itself. The element technology is intended to simulate human brain functions, such as perception, judgment, and the like, using machine-learning algorithms, such as deep learning, and includes techniques such as linguistic understanding, visual understanding, inference/prediction, knowledge representation, motion control, and the like.

Meanwhile, an electronic device can be controlled to sense a user's access and provide service to the user. In some cases, it is difficult to distinguish between access with no intent to use and access with intent to use.

SUMMARY OF THE DISCLOSURE

The present disclosure aims at solving the aforementioned needs and/or problems.

The present disclosure also aims at implementing a device control method based on user recognition and a device therefor, that can determine whether there is an intent to use based on a user's motion or gaze.

The present disclosure also aims at implementing a device control method based on user recognition and a device therefor, that can reduce unnecessary power consumption by turning off an information display function if it is determined that the user has no intent to use.

The present disclosure also aims at implementing a device control method based on user recognition and a device therefor, that can identify a registered user by using a vision-based identification model.

The present disclosure also aims at implementing a device control method based on user recognition and a device therefor, that can identify a user based on a speaker's voice and modify vision-based identification results by using voice-based identification results.

The present disclosure also aims at implementing a device control method based on user recognition and a device therefor, that can provide various content preferred by an identified user based on information on the identified user.

According to one aspect of the present disclosure, there is provided an artificial intelligence-based control method comprising: when a user approaches within a set sensing range of a device, receiving an image including the user from the device; generating a first feature vector representing motion features from the image; producing a first output for determining whether there is an intent to use the device by applying the first feature vector to a first classification model; and generating a signal for controlling the device to turn on or off an information display function based on the first output.

Furthermore, the method may further comprise: generating a second feature vector representing gaze features from the image; producing a second output for determining whether there is an intent to use the device by applying the second feature vector to a second classification model; and generating a signal for controlling the device to turn on or off the information display function based on the second output.

Furthermore, the first and second classification models may be convolutional neural network-based learning models.

Furthermore, the gaze features may comprise at least one among the user's direction of gaze, the amount of time the user looks at the device, and the angle between a camera placed in the device and the irises.

Furthermore, the motion features may comprise at least one either a moving pattern or walking speed based on the user's skeleton.

Furthermore, the method may further comprise identifying a registered user based on the user's vision features including at least one among the motion features, facial expressions, and gaze features, wherein the first output has a different value for each registered user.

Furthermore, the method may further comprise: receiving the user's voice; generating a third feature vector representing speech features from the voice; and identifying a speaker having the most similar speech features among a plurality of registered speakers by applying the third feature vector to a speaker identification model.

Furthermore, the method may further comprise, if an identification result based on the vision features and an identification result based on the speech features are different, modifying user information labeled with the vision features in such a way as to be mapped to user information identified based on the speech features.

Furthermore, the method may further comprise generating a signal for performing control such that preferred content based on the identified registered user's history of use is shown through a display.

Furthermore, the sensing range may be the angle of view of a camera provided in the device.

Furthermore, the device may be either a TV or an airport robot.

According to another aspect of the present disclosure, there is provided an intelligent device comprising: a communication module; a sensor for sensing a user's access; and a processor that, when the user approaches within a set sensing range of the sensor, receives an image including the user from the device, that generates a first feature vector representing motion features from the image, that produces a first output for determining whether there is an intent to use the device by applying the first feature vector to a first classification model, and that generates a signal for controlling the device to turn on or off an information display function based on the first output.

BRIEF DESCRIPTION OF THE DRAWINGS

The attached drawings, which are included as part of a detailed description to help you understand this statement, provide an example of implementation for this statement and explain the technical features of this statement with a detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
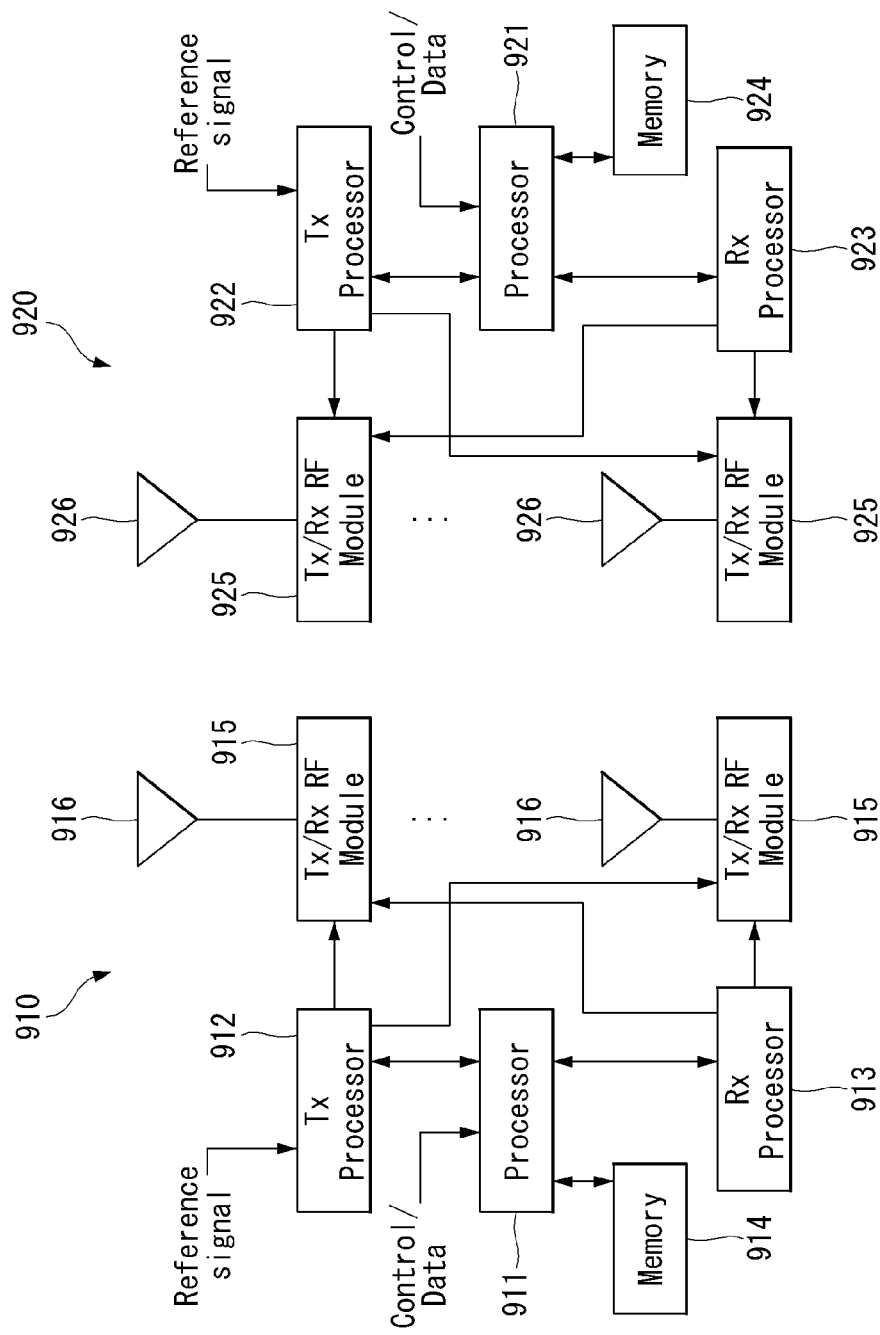
FIG. 1 shows an example of a block diagram of a wireless communication system to which methods proposed in the present specification is applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, vehicles, vehicles equipped with self-driving features, connected cars, drones, AI (Unmanned Aerial Vehicle, UAV), robots, Aged Reality (AR) devices, VR (Virtual Reality) devices, MED REALity devices, public safety devices, public TCs, MTC devices, IoT devices, medical devices, FinTech devices (or financial devices), security devices, climate/environmental devices, 5G services, or other devices related to the fourth industrial revolution, or like.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication

Figure 2:
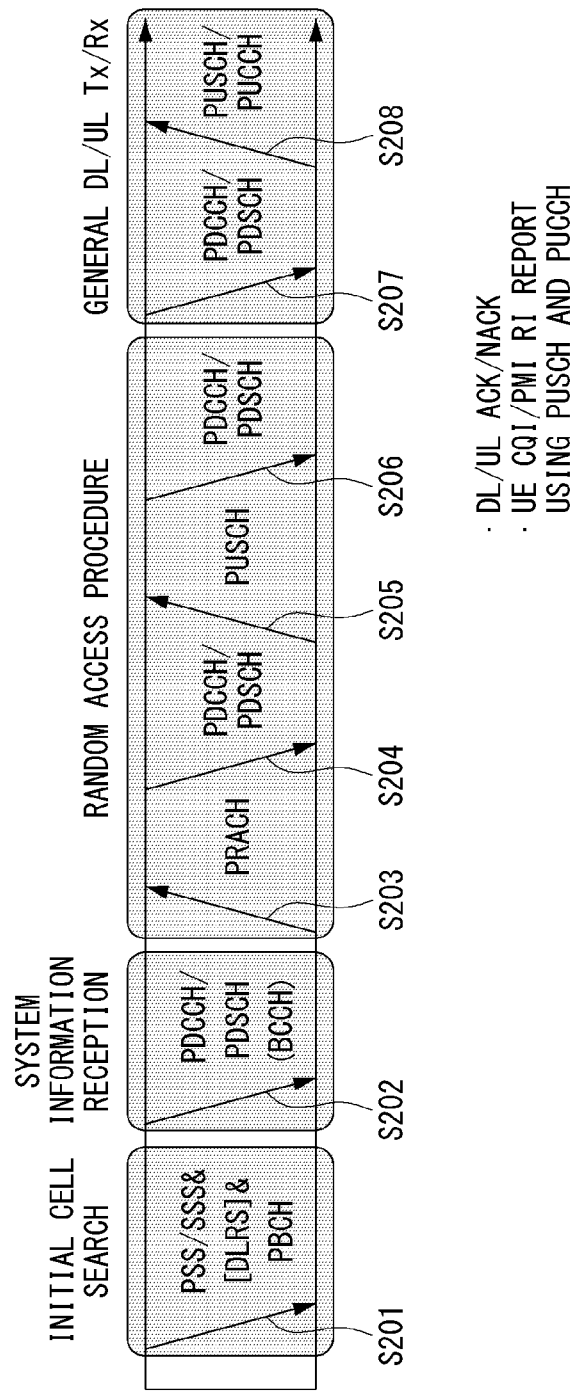
FIG. 2 is a diagram showing an example of a signal transmitting/receiving method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtain through an SSS of the cell, and information on the cell ID among 336 cell ID groups is provided/obtaind through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

ABM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.
- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.
- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.
- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
  - When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.
In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
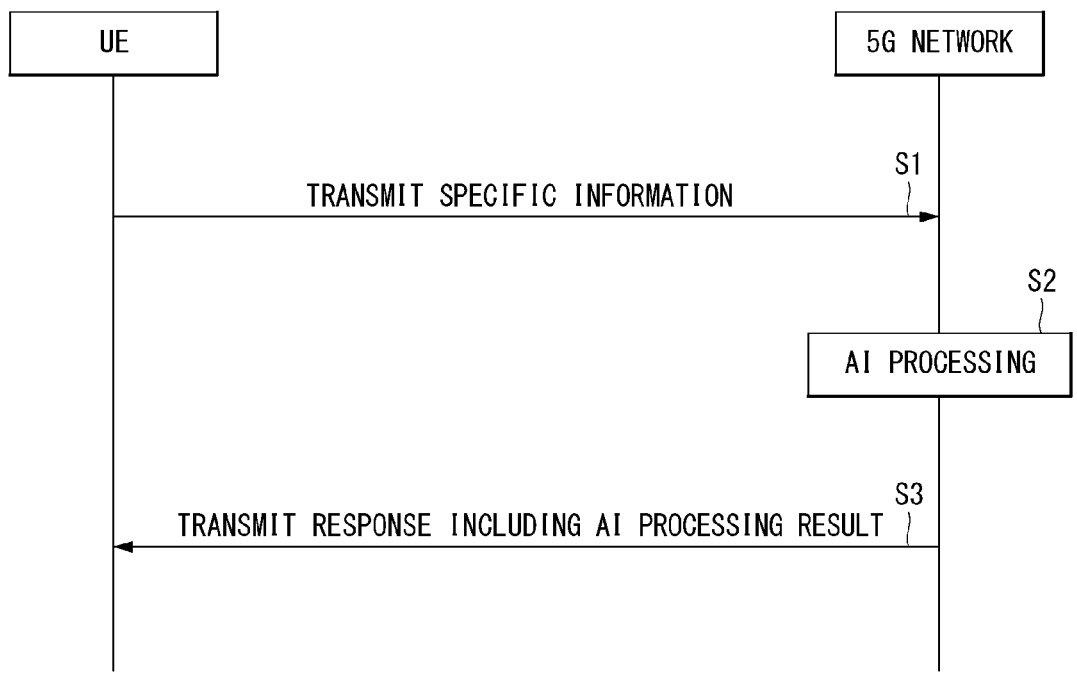
FIG. 3 shows an example of a user terminal and a 5G network in a 5G communication system.

FIG. 3 shows an example of basic operations of AI processing in a 5G communication system.

The UE transmits specific information to the 5G network (SI). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Block Diagram of AI Device

Figure 4:
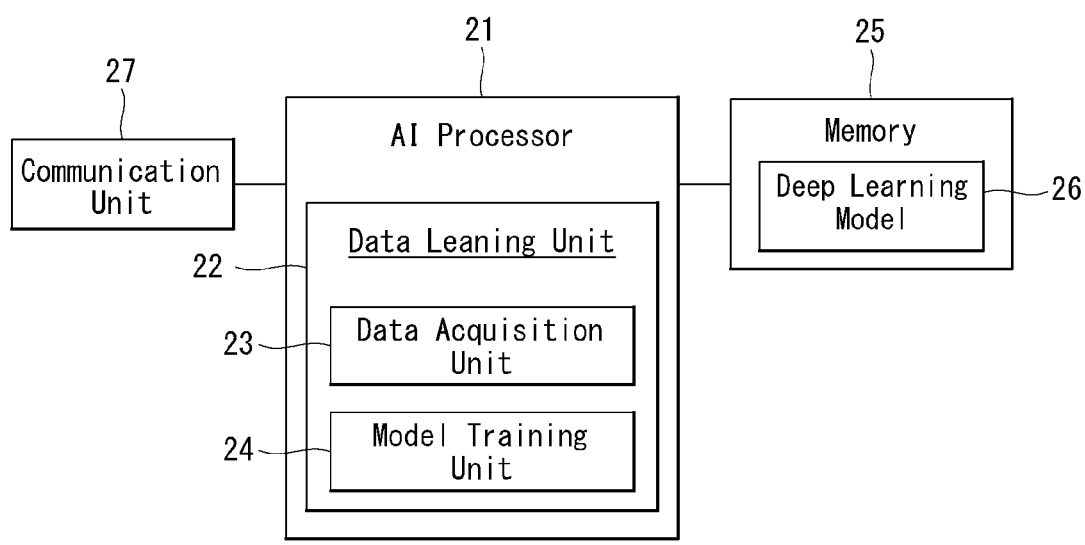
FIG. 4 is a block diagram of an AI device according to an exemplary embodiment of the present disclosure.

FIG. 4 is a block diagram of an AI device according to an exemplary embodiment of the present disclosure.

The AI device 20 may include an electronic device including an AI module capable of performing AI processing or a server including the AI module. In addition, the AI device 20 may be included in at least a part of the speech providing device 10 illustrated in FIG. 5 and may be provided to perform at least some of the AI processing together.

Figure 5:
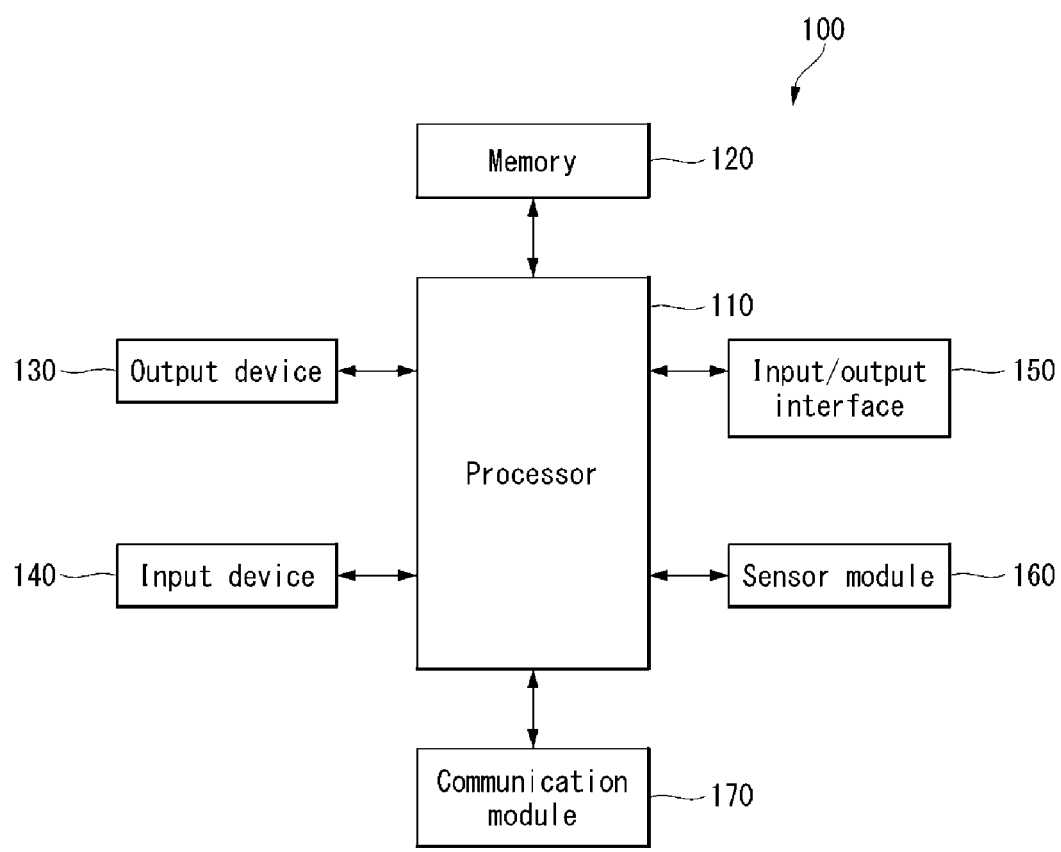
FIG. 5 is a view depicting a block diagram of an electronic device.

The AI processing may include all operations related to the control of the terminal 10 shown in FIG. 5. For example, the terminal 10 may AI-process power usage data of each home appliance transmitted from each smart plug to perform processing/determination or a control signal generation operation. In addition, for example, the terminal 10 may AI-process data received through the communication unit to perform control of the terminal.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25.

In particular, the AI processor 21 may learn a neural network for obtaining estimated noise information by analyzing the operating state of each speech providing device. In this case, the neural network for outputting estimated noise information may be designed to simulate the human's brain structure on a computer, and may include a plurality of network nodes having weight and simulating the neurons of the human's neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks(CNN), recurrent neural networks (RNN), a restricted boltzmann machine (RBM), deep belief networks (DBN), and a deep Q-network, and can be applied to fields such as computer vision, speech providing, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtaind learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data obtaining unit 23 and a model learning unit 24.

The learning data acquisition unit 23 may obtain training data for a neural network model for classifying and recognizing data. For example, the learning data acquisition unit 23 may obtain an operating state to be input to the neural network model and/or a feature value, extracted from the operating state, as the training data.

The model learning unit 24 can perform learning such that a neural network model has a determination reference about how to classify predetermined data, using the obtaind learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The training data preprocessor may pre-process an obtained operating state so that the obtained operating state may be used for training for recognizing estimated noise information. For example, the training data preprocessor may process an obtained operating state in a preset format so that the model training unit 24 may use obtained training data for training for recognizing estimated noise information.

Furthermore, the training data selection unit may select data for training among training data obtained by the learning data acquisition unit 23 or training data pre-processed by the preprocessor. The selected training data may be provided to the model training unit 24. For example, the training data selection unit may select only data for a syllable, included in a specific region, as training data by detecting the specific region in the feature values of an operating state obtained by the speech providing device 10.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle.

Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 5 is a view depicting a block diagram of an electronic device.

Referring to FIG. 5, the electronic device 100 may comprise at least one processor 110, a memory 120, an output device 130, an input device 140, an input/output interface 150, a sensor module 160, and a communication module 170.

The processor 110 may include one or more application processors AP, one or more communication processors CP, or at least one AI (artificial intelligence) processor. The application processor, communication processor, or AI processor may be included in different IC (integrated circuit) packages or in a single IC package.

The application processor may run an operating system or an application program to control a plurality of hardware or software elements connected to the application processor, and may process/compute various data including multimedia. In an example, the application processor may be implemented with a system on chip (SoC). The application processor may further include a graphic processing unit (GPU) (not shown).

The communication processor may perform a function of managing data links and converting communication protocols in communication between different electronic devices connected over a network to the electronic device 100. In an example, the communication processor may be implemented with an SoC. The communication processor may perform at least some of multimedia control functions.

Moreover, the communication processor may control data transmission and reception of the communication module 170. The communication processor may be implemented to be included as at least part of the application processor.

The application processor or the communication processor may load an instruction or data received from a nonvolatile memory or at least one of other components connected to them on a volatile memory and process the loaded instruction or data. Also, the application processor or the communication processor may store data received from or created by at least one of other components on a nonvolatile memory.

The memory 120 may include an internal memory or an external memory.

The internal memory may include at least one between a volatile memory (e.g., a dynamic random access memory (DRAM), a static RAM (SRAM), a synchronous dynamic RAM (SDRAM), and the like) and a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like). According to an exemplary embodiment, the internal memory may take the form of a solid-state drive (SSD). The external memory may further include a flash drive, for example, CompactFlash (CF), secure digital (SD), micro secure digital (Micro-SD), mini secure digital (Mini-SD), extreme digital (xD), memory stick, etc.

The output device 130 may include at least either a display module or a speaker. The output device 130 may display various data including multimedia, text data, audio data, etc. or output them as sound.

The input device 140 may include a touch panel, a digital pen sensor, a key, or an ultrasonic input device. In an example, the input device 140 may be an input/output interface 150. The touch panel senses touch input via at least one among capacitive, resistive, infrared and ultrasonic methods. Additionally, the touch panel may further comprise a controller (not shown). In the case of the capacitive method, proximity sensing is possible, as well as direct touch. The touch panel may further include a tactile layer. In this case, the touch panel may provide tactile feedback to the user.

The digital pen sensor may be implemented in the same or similar way as receiving the user's touch input or by using a separate layer for recognition. A keypad or touch key may be used as the key. The ultrasonic input device is a device that allows a terminal to identify data by sensing micro sound waves through a pen that generates ultrasonic signals, which is capable of wireless sensing. The electronic device 100 may receive user input from an external device (for example, a network, computer, or server) connected to it by using the communication module 170.

The input device 140 may further include a camera module and a microphone. The camera module is a device for capturing images and video, and may include one or more image sensors, an image signal processor (ISP), or a flash LED. The microphone may receive audio signal and convert it into electrical signal.

The input/output interface 150 may receive an instruction or data as an input from the user via an input device or output device and deliver the received instruction or data to the processor 110, memory 120, communication module 170, and so on via a bus (not shown). In an example, the input/output interface 150 may provide the processor 110 with data on the user's touch input through the touch panel. In an example, the input/output interface 150 may provide the instruction or data received from the processor 110, memory 120, communication module 170, etc. via a bus as an output to the output device 130 through the output device 130. In an example, the input/output interface 150 may provide audio data processed through the processor 110 as an output to the user through a speaker.

The sensor module 160 may include at least one among a gesture sensor, a gyro sensor, a barometric pressure sensor, a magnetic sensor, an acceleration sensor, a grip sensor, a proximity sensor, an RGB (red, green, blue) sensor, a biosensor, a temperature/humidity sensor, an illumination sensor, and a UV (ultraviolet) sensor. The sensor module 160 may measure a physical quantity or detect the operating status of the electronic device 100, and may convert measured or detected information into electric signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, or a fingerprint sensor. The sensor module 160 may further include a control circuit to control at least one sensor included therein.

The communication module 170 may include a wireless communication module or an RF module. The wireless communication module may include, for example, Wi-Fi, BT, GPS, or NFC. For example, the wireless communication module may provide a wireless communication function by using wireless frequencies. Additionally or alternatively, the wireless communication module may include a network interface or modem for connecting the electronic device 100 to a network (e.g., Internet, LAN, WAN, telecommunication network, cellular network, satellite network, POTS, or 5G network).

The RF module may be in charge of transmitting and receiving data, for example, RF signals or invoked electronic signals. In an example, the RF module may include a transceiver, a power amp module (PAM), a frequency filter, or a low noise amplifier (LNA). Also, the RF module may further include parts for transmitting and receiving electron waves in free space in wireless communication—for example, a conductor or conducting wire.

The electronic device 100 according to various exemplary embodiments of the present disclosure may include at least one among a TV, a refrigerator, an oven, a clothes styler, a robotic cleaner, a drone, an air conditioner, an air purifier, a PC, a speaker, a home CCTV, lighting, a washing machine, and a smart plug. The components of the electronic device 100 illustrated in FIG. 4 exemplify components commonly provided in electronic devices, so the electronic device 100 according to the exemplary embodiments of the present disclosure are not limited to the above-described components but may omit some of them or have additional components if required. The electronic device 100 may perform artificial intelligence-based control operation by receiving AI processing results from the AI device illustrated in FIG. 4, or may perform AI processing in on-device mode by including an AI module which is a single module into which the components of the AI device are integrated.

In the present disclosure, user recognition of an electronic device, such as an airport robot or TV, equipped with an information display function for the user and various control operations based on the user recognition will be described below.

Figure 6:
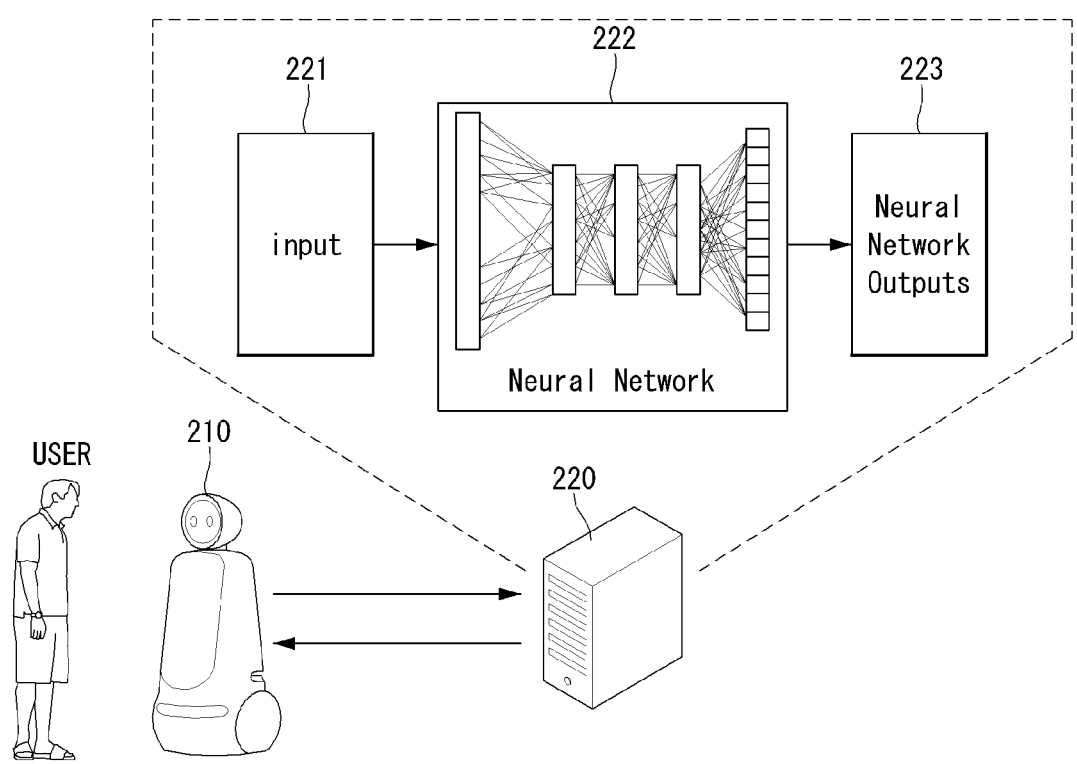
FIG. 6 is a view illustrating user recognition system according to an exemplary embodiment of the present disclosure.

FIG. 6 is a view illustrating a user recognition system according to an exemplary embodiment of the present disclosure.

Referring to FIG. 6, the user recognition system may comprise a server 220 and a device 210 communicatively connected to the server 200.

The server 200 may be operated by at least one operating entity. The server 220 may comprise a plurality of servers operated by a plurality of operating entities. Moreover, the device 210 and the server 220 may communicate with each other within at least one network. Furthermore, the network includes a local area network (LAN), a wide area network (WAN), a value added network (VAN), a mobile radio communication network, a satellite communication network, and a combination thereof, and, is a data communication network in a comprehensive sense, by which each entity constituting the network may smoothly communicate with one another. In an example, the network may include wired internet, wireless internet, or a mobile wireless communication network. For example, the wireless communication may include, but not limited to, wireless LAN (Wi-Fi), Bluetooth, Bluetooth low energy, Zigbee, Wi-Fi Direct (WFD), ultra wideband (UWB), infrared data association (IrDA), and near field communication (NFC).

The server 220 applied in an exemplary embodiment of the present disclosure may comprise an AI processor. As described above with reference to FIG. 4, the AI processor may train a neural network by using a program stored in a memory. Notably, the AI processor may train a neural network related to the control operation of the device 210 or perform AI processing by using a trained neural network-based model.

The server 220 applied in an exemplary embodiment of the present disclosure may store at least one learning model 222 in a memory in order to perform various artificial intelligence-based processing/decision-making processes. In an example, the learning model 222 may include, but not limited to, a first classification model for determining whether the user USER has an intent to use based on motion features included in an image, a second classification model for determining whether the user USER has an intent to use based on gaze features included in an image, a speaker identification model for identifying a registered user USER from speech features, and so on, and may include an additional learning model 222 for performing various artificial intelligence-based processing/decision-making processes.

The server may extract features reflecting classification or measurement results from input data 221 by using a deep learning-based learning model 222, and may derive the weights and biases of an artificial neural network that minimize errors in results 223 by performing an algorithm training process on the extracted features.

The device 210 communicatively connected to the server 220 may comprise at least one among a memory, a communication module, and a processor, like the electronic device described above with reference to FIG. 5. The device 210 may be one among a TV, a refrigerator, an oven, a clothes styler, an airport robot, an air conditioner, an air purifier, and a washing machine.

In an exemplary embodiment of the present disclosure, the device 210 may be communicatively connected to the server 220 and receive AI-processed information from the server 200 and perform or change various control operations based on the received information. Specifically, the device 210 may generate an image including a user USER through a camera placed in the device 210. The generated image may be sent to the server 220 through a communication module in the device 210. The server 220 may perform an operation of controlling the device 210 by sending AI-processed information for the received image to the device 210.

Meanwhile, the server 220 may perform AI processing on the device 210, not only when the device 210 is communicatively connected to it, but regardless of the state of communication, by having an AI chip with at least one artificial neural network-based learning model 222 stored therein.

User recognition and a control process based on user recognition according to various exemplary embodiments of the present disclosure will be described below with reference to the disclosure and drawings. Also, the term "device" may be interchangeably used with an "electronic device" or "external device", and the term "server" may be interchangeably used with an "external server".

Figure 7:
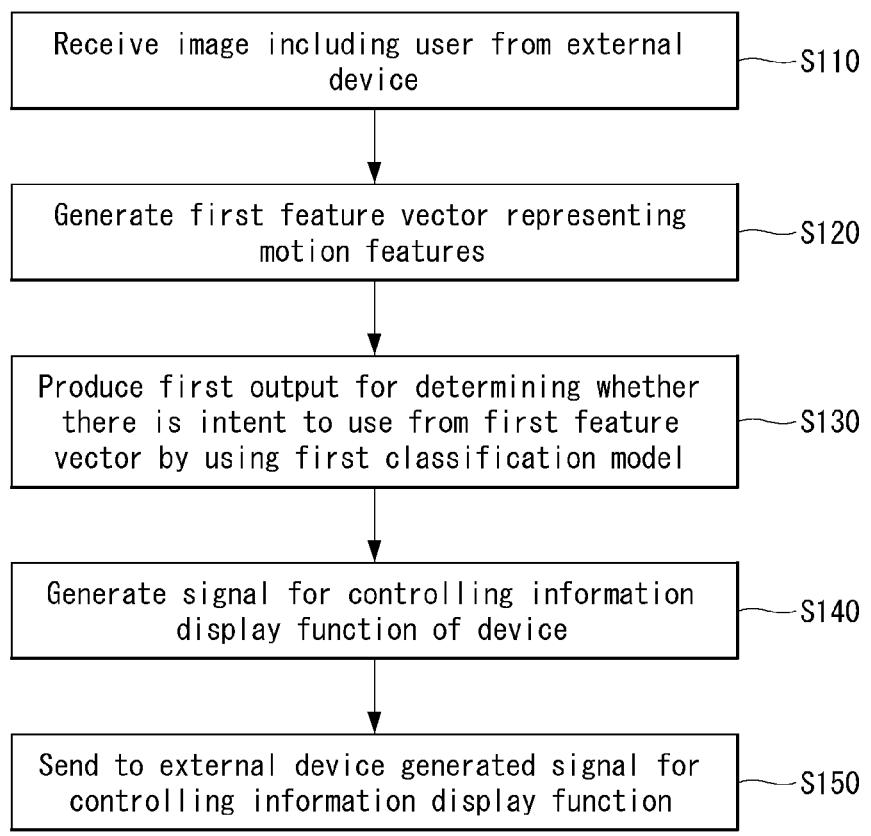
FIG. 7 is a schematic flowchart of a control method based on user recognition according to an exemplary embodiment of the present disclosure.

FIG. 7 is a schematic flowchart of a control method based on user recognition according to an exemplary embodiment of the present disclosure.

Referring to FIG. 7, the server 220 may receive an image including a user from an external device 210 through a communication module (S110). Here, the image may comprise information on the user's moving direction and speed, the moving speed of each region of the user's body, the user's face, the direction of gaze, or the distance between the irises.

The server may generate a first feature vector representing motion features from the image (S120). Here, the motion features may include, but not limited to, skeleton features. The skeleton features may allow for recognizing different regions of the user's body as feature points and comprise speed and/or acceleration information relating to the feature points.

The server 220 may produce a first output for determining whether the user has an intent to use the device 210 by applying the first feature vector to the first classification model (S130). Here, the first classification model may be a trained, artificial neural network-based learning model. The artificial neural network may comprise an input layer, an output layer, and at least one hidden layer. Each layer may have at least one node. The artificial neural network-based learning model may produce an output for input data through the connections (e.g., weights) between nodes.

The server 220 may generate a signal for controlling the device 210 to turn off its information display function based on the first output (S140). Here, the information display function may include all display and/or output functions for image information or audio information and are not limited to display functions. Moreover, in the case of a device 210 equipped with a moving means, the information display function may further comprise a function of driving toward a target user in order to deliver information to the target user.

The server 220 may send to an external device 210 the generated signal for controlling the information display function of the device 210 through the communication module (S150).

Figure 8:
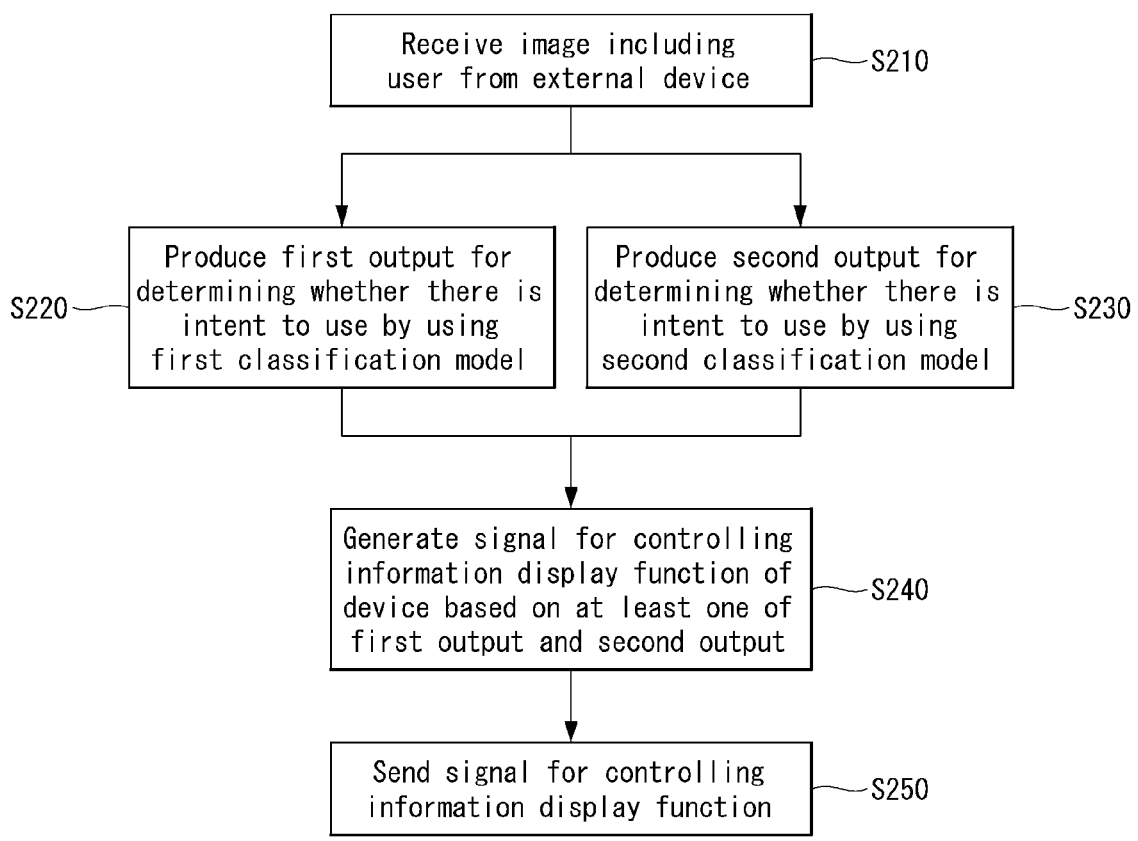
FIG. 8 is a detailed flowchart of a control method based on user recognition according to an exemplary embodiment of the present disclosure.

FIG. 8 is a detailed flowchart of a control method based on user recognition according to an exemplary embodiment of the present disclosure. Meanwhile, a description of redundancies with what has been described with reference to FIG. 7 will be omitted.

Referring to FIG. 8, the server 220 may receive an image including a user from an external device 210 through a communication module (S210).

The server 220 may generate a first feature vector representing motion features from the image and produce a first output for determining whether the user has an intent to use the device 210 by applying the first feature vector to a first classification model (S220). The motion features may comprise, for example, at least one either a moving pattern or walking speed based on the user's skeleton.

The server 220 may generate a second feature vector representing gaze features from the image and produce a second output for determining whether the user has an intent to use the device 210 by applying the second feature vector to a second classification model (S230). The gaze features may comprise, for example, at least one among the user's direction of gaze, the amount of time the user looks at the device 210, and the angle between a camera placed in the device 210 and the irises.

The server 220 may generate a signal for controlling the device 210 to turn off its information display function based on at least one of the first output and second output (S240). In an example, even if it is determined that the user has an intent to use based on the first output, the server 220 may determine that the user has no intent to use once it is determined that the user has no intent to use based on the second output (first method). In another example, even if it is determined that the user has no intent to use based on the second output, the server 220 may determine that the user has an intent to use once it is determined that the user has an intent to use based on the first output (second method).

In this case, if the results of decision-making based on both the first and second outputs require determining that there is an intent to use, this will increase the probability of turning off the information display function of the device 210, whereas, if the result of decision-making based on any one of the first and second outputs require determining that there is an intent to use, this will increase the probability of turning on the information display function of the device 210. The above-described first and second methods may be selectively applied depending on the environment and/or use of the device 210.

The server 220 may send to an external device 210 the generated signal for controlling the information display function of the device 210 through the communication module (S250).

Figure 9:
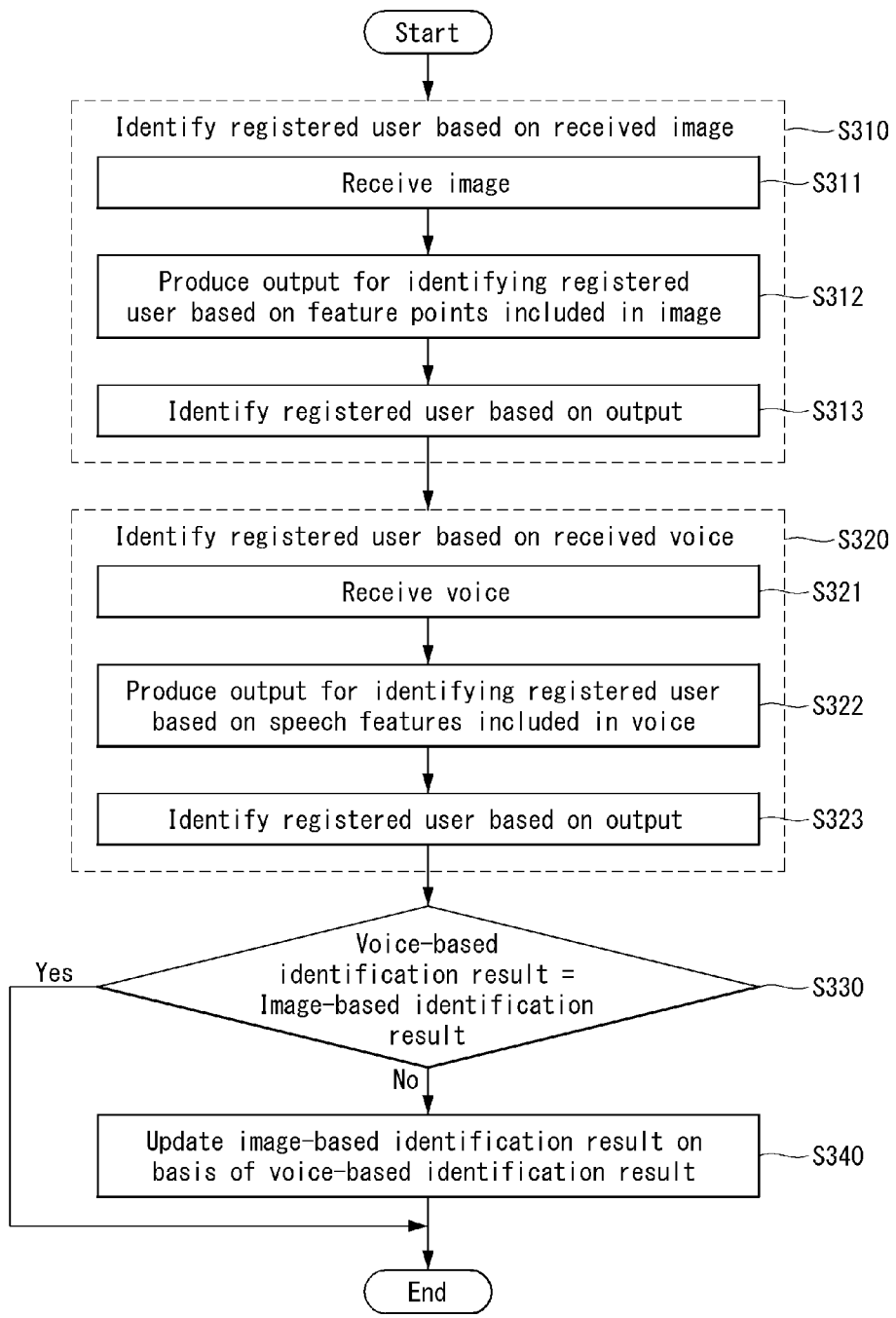
FIG. 9 is a flowchart of a device control method adapted to a registered user according to an exemplary embodiment of the present disclosure.

FIG. 9 is a flowchart of a device control method adapted to a registered user according to an exemplary embodiment of the present disclosure.

To improve the accuracy of the above-described user recognition, in the case of a personalized device 210, the server 220 may perform user registration and recognize a user by analyzing motion features and/or gaze features based on registered user information.

The server 220 may identify a registered user based on user information contained in an image received from the device 210 (S310). Specifically, the server 220 may receive an image containing user information from the device 210 (S311). The server 220 may produce an output for identifying a registered user based on features included in the user information (S312). The server 220 may identify a registered user based on the output (S313).

The user information may be vision features including at least one among the motion features, facial expressions, and gaze features. The server 220 may extract feature points included in the image by using an artificial intelligence neural network-based, vision recognition-based identification model stored in the server 220 and produce an output for identifying a registered user from the extracted feature points. The server 220 may identify whether a person included in the image is a registered user or an unregistered user. Moreover, the server 220 may distinguish a registered user from other registered users.

The server 220 may receive a user's voice and identify whether the user is a registered user based on speech features included in the received voice (S320). Specifically, the server 220 may receive a voice from the device 210 (S321). The server 220 may produce an output for identifying a registered user based on speech features included in the voice (S322). The server 220 may identify a registered user based on the output (S323).

In this instance, the voice may comprise an activation word for waking up the device 210. In an example, if the user utters "Hi, LG" toward the device 210, the device 210 transmits the voice including the activation word to the server 220, and the server 220 may analyze the received voice and transmit to the device 210 a signal for waking up the device 210. In another example, upon receiving the wakeup signal, the device 210 does not transmit the voice to the server 220 but may analyze the received voice by using a learning model stored in the device 210 and wake up the device 210 according to the result of the analysis. However, it should be noted that the device 210 according to an exemplary embodiment of the present disclosure may transmit the voice to the server 220 through the communication module in order to implement a user recognition function, apart from the wakeup.

Regarding S322, the server 220 may generate a feature vector representing speech features from the received voice. The server 220 may identify a speaker having the most similar speech features among a plurality of registered speakers by applying the generated feature vector to a trained speaker identification model.

If there is a difference between a first user identification result based on speech features and a second user identification result based on vision features, the second user identification result may be updated on the basis of the first user identification result (S330: No, S340). Specifically, the server 220 may update at least one learning model related to the vision features to make the first user identification result and the second user identification result identical. The user identification result based on speech features may have higher accuracy than the user identification result based on vision features. Thus, the accuracy of inference based on vision features also may be improved, as well as the accuracy of inference based on speech features, by repeatedly updating the learning model.

Figure 10:
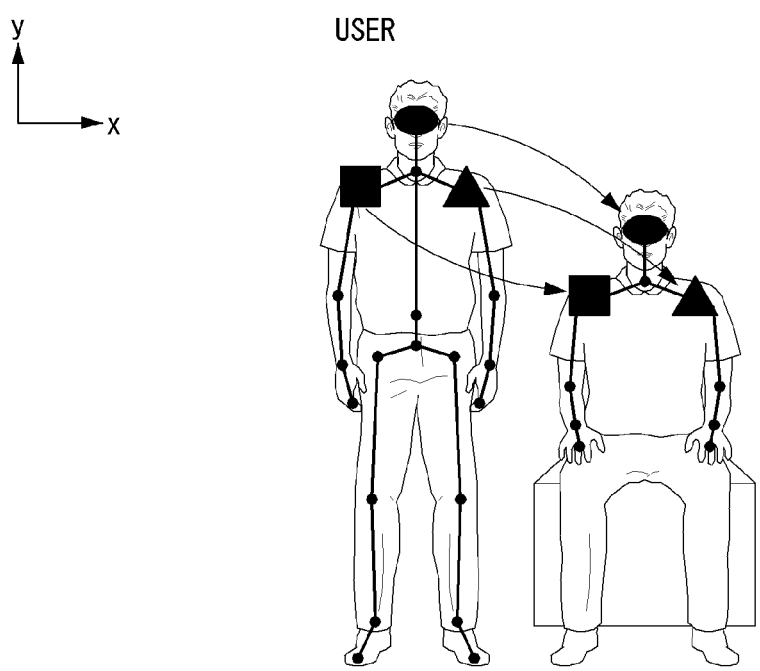
FIGS. 10 and 11 are views illustrating an example of user recognition based on motion features according to an exemplary embodiment of the present disclosure.
Figure 11:
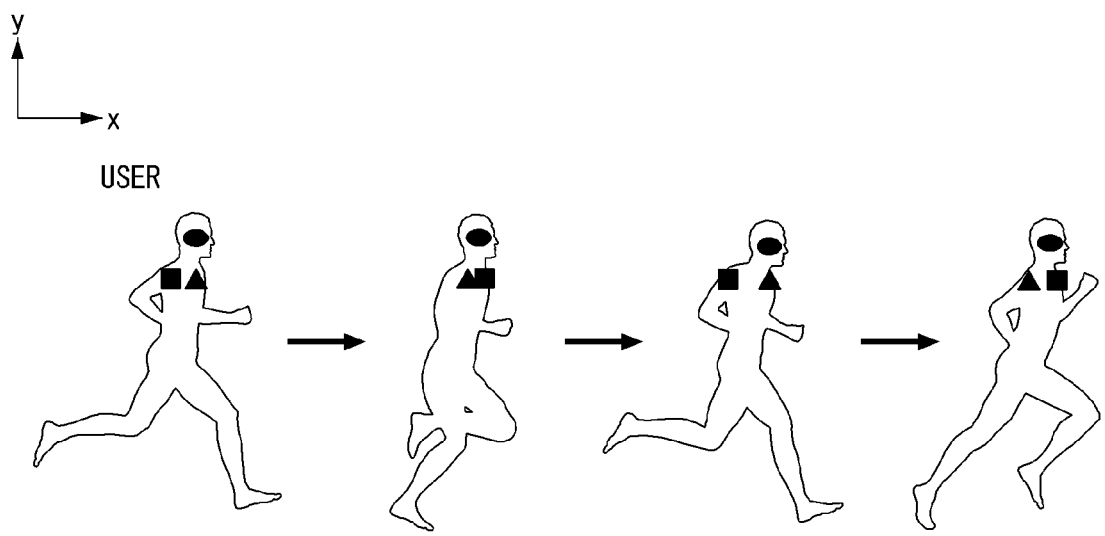

FIGS. 10 and 11 are views illustrating an example of user recognition based on motion features according to an exemplary embodiment of the present disclosure.

Hereinafter, in FIGS. 10 and 11, the processor refers to at least one processor or AI processor capable of AI processing. Moreover, the at least one processor or AI processor may be included in a server or device and used to perform AI processing. Hereinafter, in the present disclosure, the processor will be described as being included in a server or a device by way of example, but not limited to this.

The processor 110 may perform a user recognition process for sensing a user USER's access or identifying an approaching user USER, based on motion features. Here, the motion features refer to feature information relating to the motion of a user USER included in an image. In an example, the motion of the user USER may be represented based on their skeleton, and the motion features may include at least either a moving pattern or walking speed based on the user USER's skeleton. The processor 110 may determine the moving pattern or walking speed by analyzing shifts in a plurality of feature points included in the skeleton.

In an example, FIG. 10 depicts an example of identifying a user USER sitting down. Referring to FIG. 10, when the user USER is sitting down, the position of at least one feature point of the skeleton may shift over time. In an example, the feature points of the skeleton may be on the head and shoulders. In this instance, the feature point on the head may be referred to as a first feature point, the feature point on the left shoulder may be referred to as a second feature point, and the feature point on the right shoulder may be referred to as a third feature point. The feature points may be on the elbows, pelvis, knees, ankles, etc., without being limited to the aforementioned first to third feature points.

Referring again to FIG. 10, when the user USER is sitting down, the position of the first feature point goes down gradually over time from 10 to 4 in 0.1 second increments, and the positions of the second and third feature points go down gradually for the initial 0.5 seconds and then are maintained from 0.6 seconds onwards. The position values may be measured in millimeters, centimeters, or meters. The processor 110 may calculate the changes in the speed of the first to third feature points with the shifts in the positions of the first to third feature points. The processor 110 may determine that the user USER is sitting down, based on the speed change calculations indicating that the second and third feature points stop shifting first whereas the first feature point is shifting at a constant speed.

Referring to FIG. 11, when the user USER is walking, it can be seen that the position of the first feature point constantly shifts over time from 4 to 6, then to 7, and then to 8, in 0.1 second-increments, and that the positions of the second and third feature points shift to the left or right with respect to the first feature point. The position values may be measured in millimeters, centimeters, or meters. From these shifts in the positions of the feature points, the processor 110 may determine that the user USER included in the image is moving past the device 210, including in a jogging motion, walking motion, etc.

In a user recognition method according to an exemplary embodiment of the present disclosure, it is determined whether the user USER has an intent to use the device 210, by using the above-described at least one feature point included in the skeleton. The processor 110 may identify at least one motion among moving past the device 210 from at least one feature point, standing in front of the device 210, and sitting in front of the device 210. The processor 110 may determine whether the user USER has an intent to use by using feature points for identifying various motions of the user USER. The processor 110 may apply an image received from the device 210 to a trained first classification model, and infer whether the user USER has an intent to use the device 210 from the output of the first classification model. That is, if the user USER has an intent to use the device 210, the processor 110 may control the device 210 to output various information through its output device. In contrast, if the user USER has no intent to use the device 210, the processor 110 may control the device 210 to stop outputting various information through its output device.

In an example, if the user USER is sitting in front of the device 210, the processor 110 may determine that the user USER has an intent to use the device 210 based on shifts in the feature points. In another example, if the user USER is moving past the device 210, the processor 110 may determine that the user USER has no intent to use the device 210 based on shifts in the feature points. In yet another example, if the user USER is standing in front of the device 210, it may be determined that the user USER has an intent to use the device 210.

However, if it is determined whether there is an intent to use, based only on the at least one feature point included in the skeleton of the user USER, user recognition may be erroneous. In an example, the user USER may look steadily at the device 210 with intent to use it while moving in a certain moving pattern. In another example, the user USER may stand still in front the device 210 without any clear intent to use it. To solve these problems, in the present disclosure, an additional user-recognition method based on gaze features will be described below.

Figure 12:
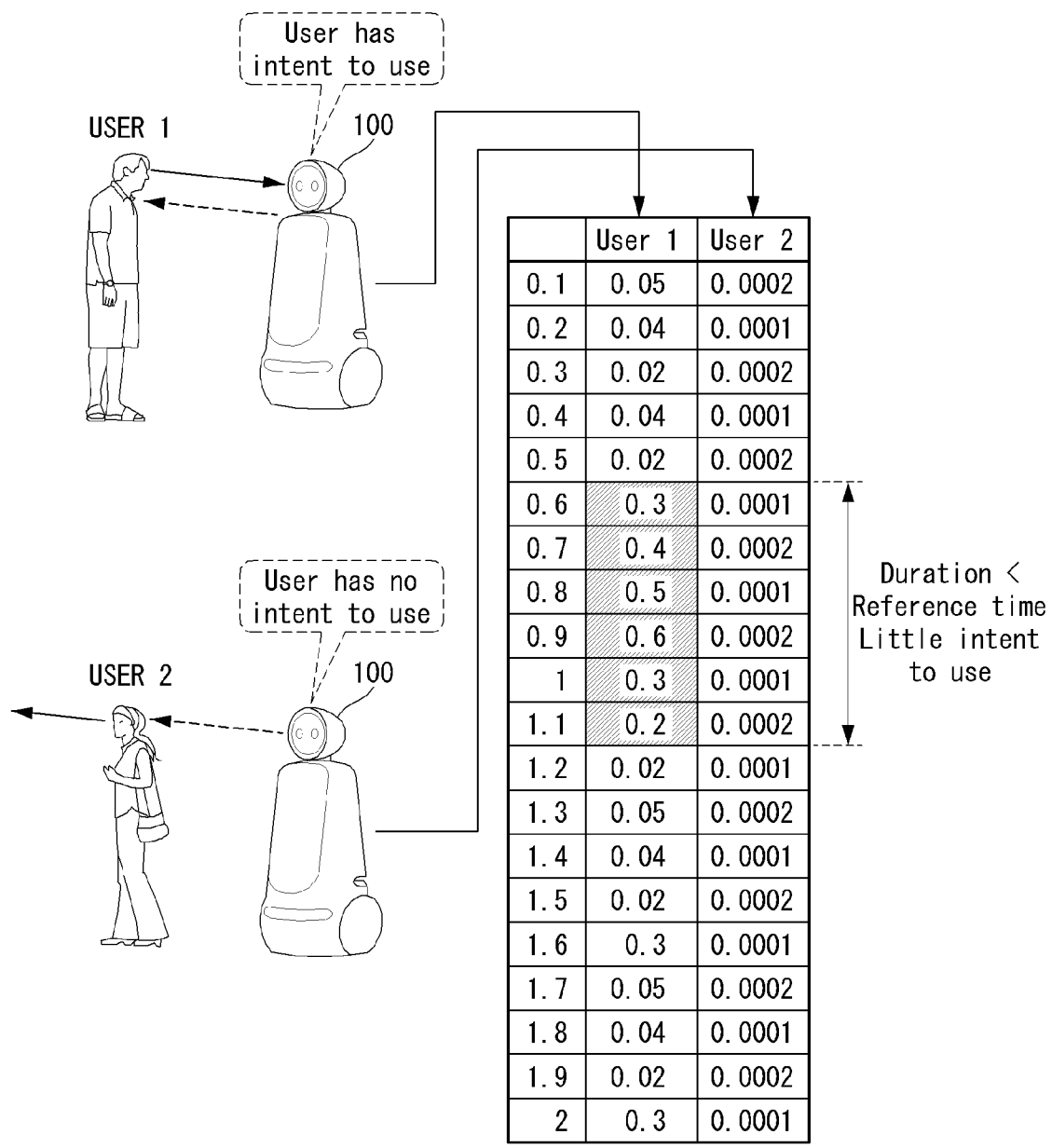
FIGS. 12 and 13 are views illustrating an example of user recognition based on gaze features according to an exemplary embodiment of the present disclosure.
Figure 13:
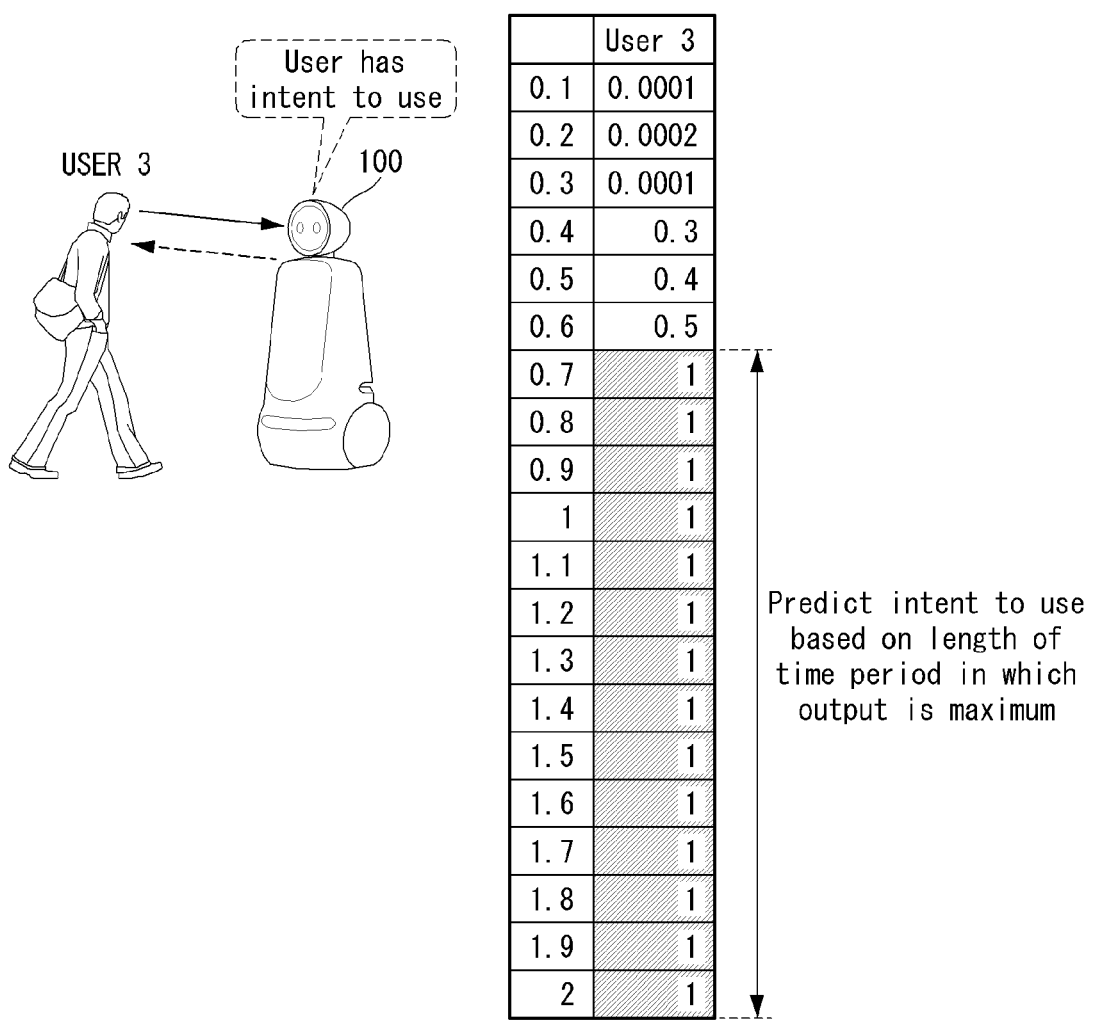

FIGS. 12 and 13 are views illustrating an example of user recognition based on gaze features according to an exemplary embodiment of the present disclosure. Hereinafter, in FIGS. 12 and 13, the processor refers to at least one processor or AI processor capable of AI processing. Moreover, the at least one processor or AI processor may be included in a server or device and used to perform AI processing. Hereinafter, in the present disclosure, the processor will be described as being included in a server or a device by way of example, but not limited to this.

The device may detect a user USER's gaze through a camera. In this case, the device may include, but not limited to, a TV, an airport robot, a washing machine, etc. Although the present disclosure will be described with, but not limited to, an example in which AI processing is performed in the server, the same process may be performed in the device.

The processor may determine whether there is an intent to use, based on the gaze features of the user USER included in an image. In this case, the user USER's gaze features may include at least one among the user USER's direction of gaze, the amount of time the user USER looks at the device, and the angle between a camera placed in the device and the irises. The processor may determine whether the user USER has an intent to use the device based on their gaze features.

In an example embodiment of the present disclosure, the processor may determine the presence or absence of the user USER's intent to use the device by applying the image to a trained classification model. In an example, if the image is applied to a trained second classification model, the processor may extract a second feature vector representing gaze features by using the second classification model and produce a second output for determining whether the user USER has an intent to use the device from the extracted second feature vector.

The processor may generate a signal for controlling the device to turn off its information display function or a signal for controlling the device to turn on its information display function, based on the second output.

FIG. 12 depicts an example of determining whether there is an intent to use the device. FIG. 12 illustrates that the device is, but not limited to, an airport robot. Referring to FIGS. 12 and 13, when determining whether there is an intent to use based on a user's motion features as described above, the processor 110 may determine that both a first user USER1 and a second user USER2 have an intent to use the device 100 because they are standing still in front of the device 100. However, even if they are standing still in front of the device 100, it may be determined that there is no intent to use unless they gaze towards the device 100. Thus, a method of determining whether there is an intent to use based on gaze features will be described below.

Referring again to FIG. 12, it can be seen that the first user USER1 has an intent to use the device 100 because he is looking at the device 100 and the second user USER2 has no intent to use the device 100 because she is not looking at the device 100. The processor 110 may determine whether a user has an intent to use by analyzing an image including at least one user.

For the first user USER1, the processor 110 may produce at least one output from an image including the first user USER1 by using the second classification model. In this case, the output of the second classification model may vary over time with a shift in the gaze of the first user USER1.

In an exemplary embodiment of the present disclosure, the processor 110 may determine whether there is an intent to use based on time-varying output. Specifically, if the length of a period of time in which the output is equal to or greater than a preset first threshold exceeds a second threshold, the server may determine that there is an intent to use. In this case, the second threshold may be modified to match the user's use pattern of the device 100 or may be preset by the user.

The table in FIG. 12 illustrates an example in which the first threshold is 0.2. Referring to the table in FIG. 12, the output of the second classification model for the first user USER1 exceeds the first threshold in the period of time between 0.6 seconds and 1.1 seconds. In this case, if the second threshold is 0.4 seconds, the processor 110 may determine that the user has an intent to use the device 100. In contrast, if the second threshold is 0.6 seconds, the processor 110 may determine that the user has no intent to use the device 100.

Moreover, the processor 110 may determine that the second user USER2 has no intent to use since the output of the second classification model for the second user USER2 does not exceed the first threshold (e.g., 0.2 seconds) throughout the entire time period.

In another exemplary embodiment of the present disclosure, the processor 110 may find a time period during at least one output in which the output is maximum and determine whether there is an intent to use based on the length of the time period in which the output is maximum. Referring to FIG. 13, the output of the second classification model for a third user USER3 is 1 in the time period between 0.7 seconds and 2 seconds. That is, the maximum value throughout the entire output is 1, and the processor 110 may decide that the determination is to be made for the time period between 0.7 seconds and 2 seconds in which the output is kept at maximum. If the length of the time period for which the determination is to be made is equal to or greater than a preset third threshold, the processor 110 may determine that the third user USER3 has an intent to use.

Figure 14:
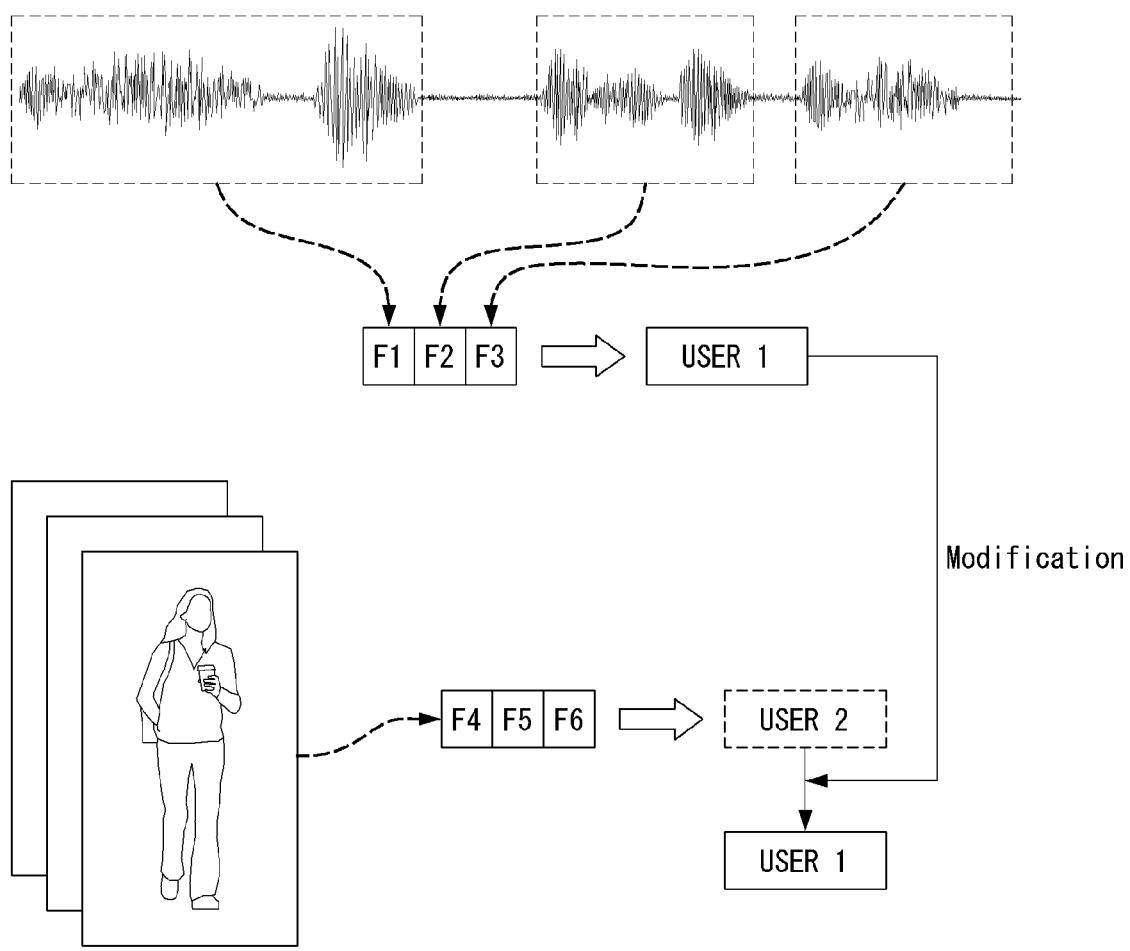
FIG. 14 is a view illustrating an example of updating a learning model applied to an exemplary embodiment of the present disclosure.

FIG. 14 is a view illustrating an example of updating a learning model applied to an exemplary embodiment of the present disclosure.

Referring to FIG. 14, the processor 110 may analyze a user's voice and identify a registered user corresponding to the voice. In an example, the processor 110 may divide the user's voice with respect to an idle period. The processor 110 may extract a feature vector representing speech features by applying the at least one piece of audio data to a third classification model and identify a registered user by using the extracted feature vector. The third classification model is a deep learning-based learning model, and may comprise a feature extractor for extracting features from input data and a user classifier for identifying a registered user by using the feature vector generated by the feature extractor.

In this case, a user identification result based on the user's voice may have higher accuracy than a user identification result based on an image. Therefore, in an exemplary embodiment of the present disclosure, the processor 110 may modify the user identification result based on the image in such a way as to be mapped to the user identification result based on the voice. Specifically, if an identification result based on the vision features and an identification result based on the speech features are different, the processor 110 may modify user information labeled with the vision features in such a way as to be mapped to the user information identified based on the speech features.

Referring again to FIG. 14, the processor 110 may divide the user's voice into at least one piece of audio data with respect to an idle period. In this case, the processor 110 may extract first to third features F1, F2, and F3 from the at least one piece of audio data. The processor 110 may identify the speaker as a first user based on the extracted speech features.

On the contrary, the processor 110 may extract fourth to sixth features F4, F5, and F6 from an image including a user. Here, the processor 110 may identify the user included in the image as a second user, based on the fourth to sixth features F4, F5, and F6.

In this case, the processor 110 may consider that the user is erroneously recognized as the second user and therefore update the learning model that has identified the user from the image in such a way that the learning model produces an output for identifying the user as the first user based on the same input data. The learning model may be used to implement more accurate user recognition since it is retrained due to the erroneous recognition.

A device applied to an exemplary embodiment of the present disclosure may be implemented as, but not limited to, either a TV or an airport robot, and also may be implemented in a well-known electronic device that has an information display function.

Figure 15:
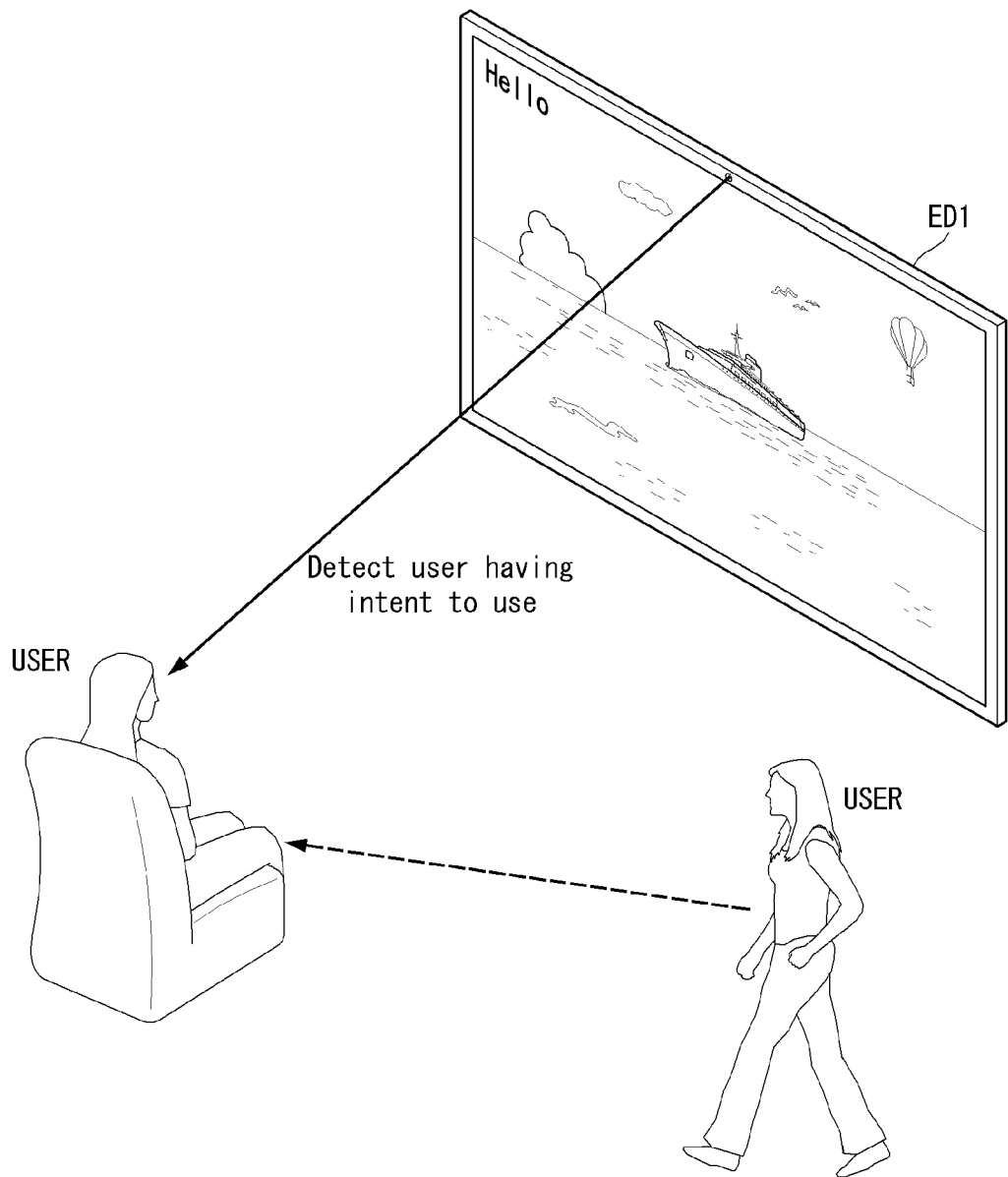
FIGS. 15 to 17 are views depicting an example of a TV device applied to an exemplary embodiment of the present disclosure.
Figure 16:
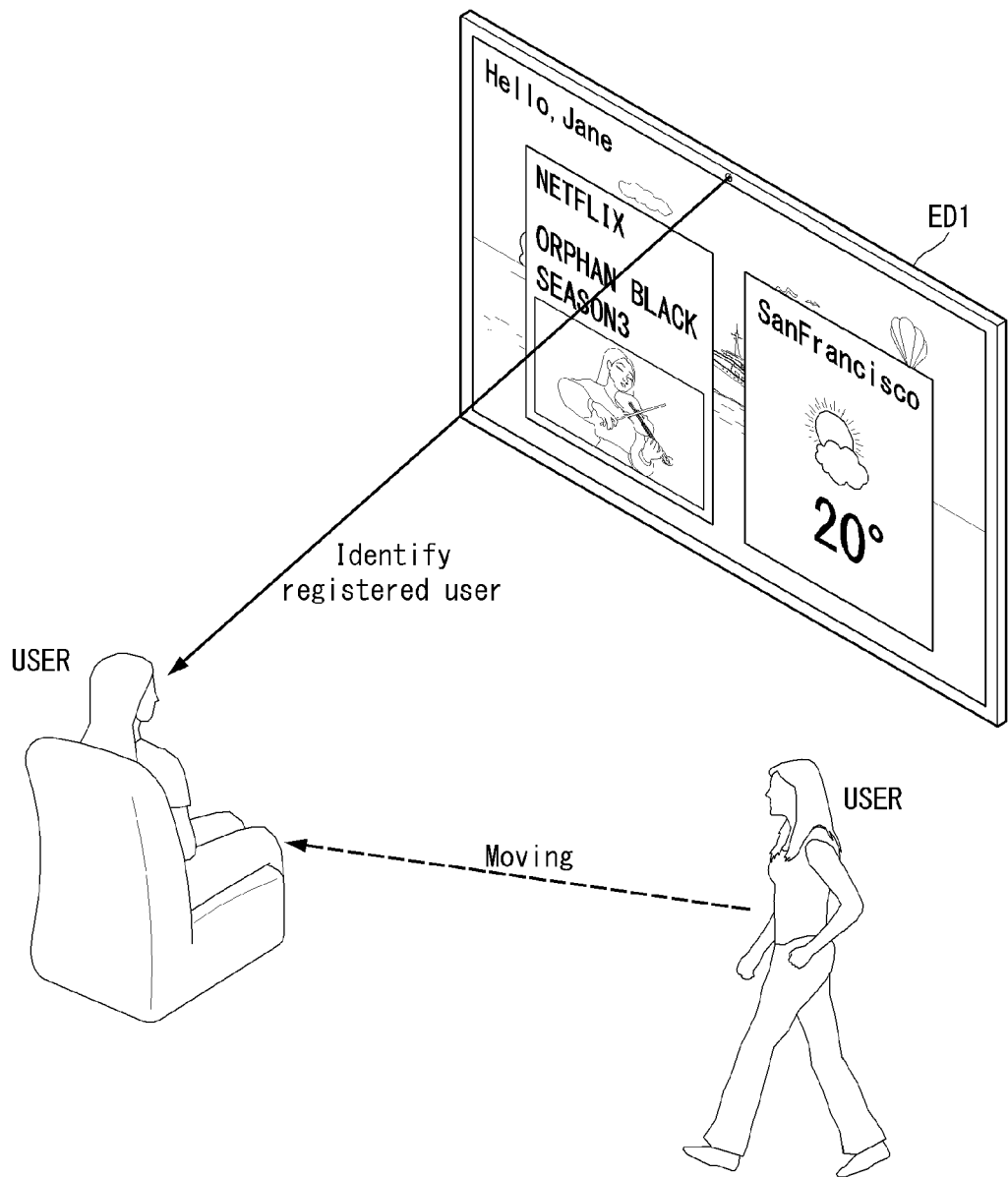
Figure 17:
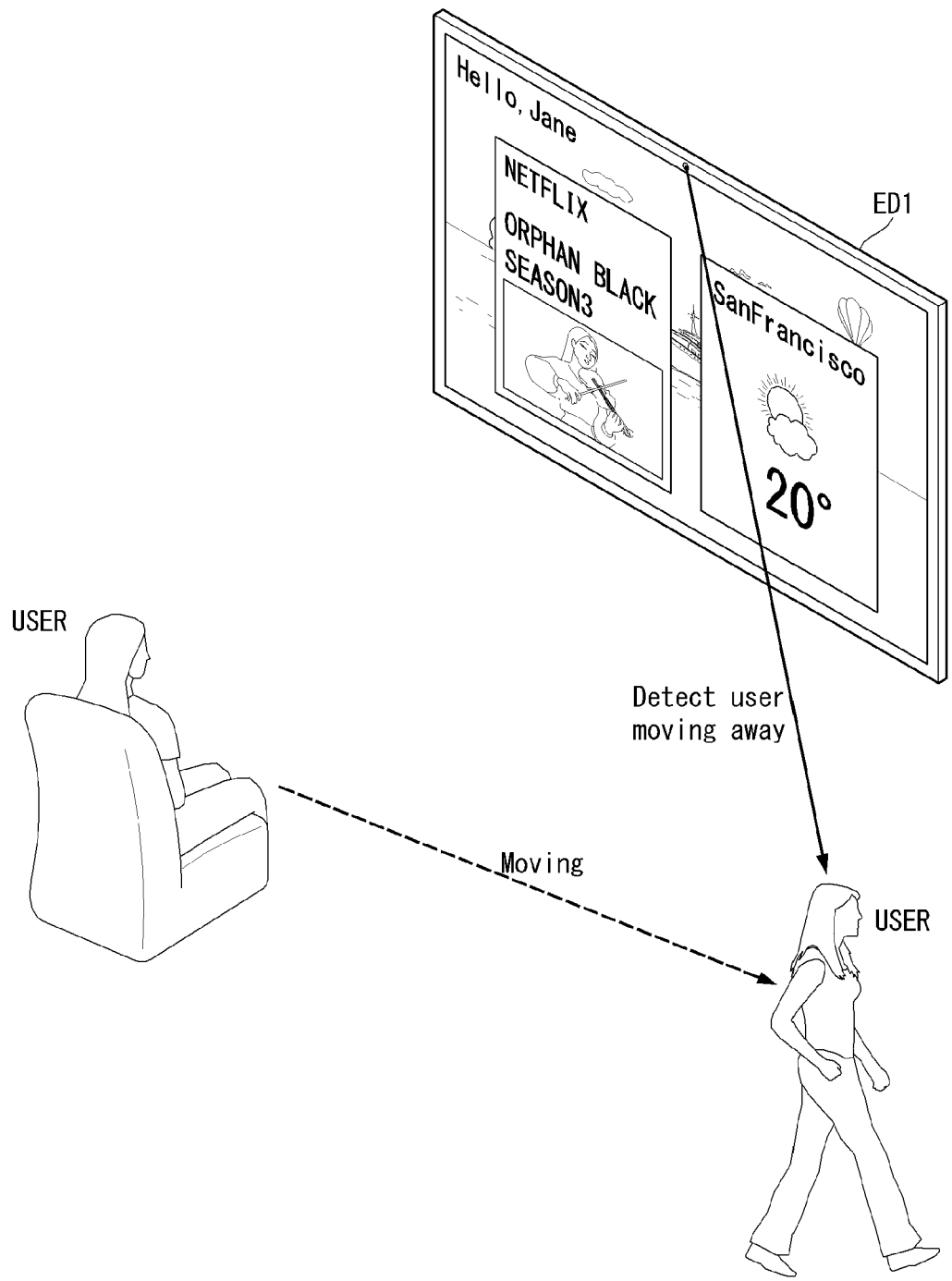

FIGS. 15 to 17 are views depicting an example of a TV device applied to an exemplary embodiment of the present disclosure.

An electronic device applied to an exemplary embodiment of the present disclosure may be implemented as a TV ED1. Here, the TV ED1 has a camera for recognizing a user USER's access or identifying a registered user USER.

First of all, the TV ED1 may sense the user USER's access through at least either a sensor or a camera. In this instance, the sensing range of the sensor or camera may be set as the angle of view of the sensor or camera provided in the TV ED1.

Referring to FIG. 15, the TV ED1 may generate an image including a user USER through a camera. In this case, the TV ED1 may sense the user USER's access by at least either a sensor or a camera and initiate capturing an image including the user USER based on the sensing result.

In this case, the TV ED1 may transmit an image obtained through the camera to the server (220 of FIG. 6). Afterwards, the server (220 of FIG. 6) may perform AI processing to determine whether the user USER has an intent to use. In an example, the server (220 of FIG. 6) may generate a first feature vector representing motion features by applying a received image to a first classification model and produce a first output for determining whether there is an intent to use the TV ED1 from the generated first feature vector.

The server (220 of FIG. 6) may generate a signal for controlling an information display function of the TV ED1 based on the first output. Here, the information display function refers to information relating to at least one content that can be outputted through a display of the TV ED1, which may include, but not limited to, a TV ED1 program, radio, weather, internet, audio, etc.

The server (220 of FIG. 6) may control the TV ED1 to turn off its information display function if the first output is less than a preset threshold, or may control the TV ED1 to turn on its information display function if the first output is equal to or greater than the preset threshold.

Accordingly, the TV ED1 may regulate control operations related to the information display function based on the user USER's intent to use, thereby reducing power consumption.

Furthermore, the server (220 of FIG. 6) may generate a second feature vector representing gaze features by applying the received image to a second classification model and produce a second output for determining whether there is an intent to use the TV ED1 from the generated second feature vector.

The server (220 of FIG. 6) may generate a signal for controlling the information display function of the TV ED1 based on the second output. The server (220 of FIG. 6) may comprehensively determine whether the user USER has an intent to use the TV ED1 based on the first output and/or second output. Through comprehensive identification, even if the user USER is identified as having an intent to use based on their motion, the server (220 of FIG. 6) may solve the problem of erroneous recognition, which may occur when analyzing whether there is an intent to use based only on the user USER's motion, as in when the user USER is not gazing at the TV ED1.

Referring to FIG. 16, the server (220 of FIG. 6) may identify a registered user USER based on vision features included in an image or speech features included in a user USER's voice. In an example, the server (220 of FIG. 6) may analyze the motion features (e.g., skeleton information) of a user USER included in an image and identify a registered user USER, by using the differences in walking or sitting habits among individual users USER. In another example, the server (220 of FIG. 6) may identify a registered user USER based on gaze features including iris information of a user USER included in an image. In yet another example, the server (220 of FIG. 6) may identify a registered user USER based on a user USER's facial expressions or the accent, frequency, pitch, etc. of the user USER's voice.

As such, based on information about an identified registered user USER, the server (220 of FIG. 6) may perform control such that various content preferred by the registered user USER is shown through a display. Moreover, if an identification result based on at least one classification model is erroneous, the server (220 of FIG. 6) may perform control such that information on the registered user USER is shown through a display. For example, the server (220 of FIG. 6) may transmit a signal for controlling the TV ED1 to display "Hello, Jane". In this case, if the user USER is not Jane, they may have the identification result modified by giving a voice input including an activation word toward the TV ED1. For example, if the user USER is not Jane but Susan, when Susan utters "Hi, LG" toward the TV ED1, the TV ED1 may modify the identification result based on motion features or gaze features, on the basis of a voice recognition result corresponding to Susan.

Referring to FIG. 17, the server (220 of FIG. 6) may control the TV ED1 to turn off its information display function once it is determined that there is an intent to use based on an image received from the TV ED1. In an example, if the user USER switches their state of motion from sitting to standing, this may decrease the probability that the USER may have an intent to use during an output based on the user USER's motion features. Moreover, if the user USER switches their motion from sitting to standing and is then detected waking to some other place, this may further decrease the probability that the user USER may have an intent to use during the output based on the user USER's motion features. As a result, the server (220 of FIG. 6) may determine that the user USER has no intent to use the TV ED1 from the output based on the motion features. Consequently, the server (220 of FIG. 6) may generate a signal for controlling the TV ED1 to turn off and transmit it to the TV ED1, due to the reason that the user USER's motion (e.g., moving away) shows no intent to use.

As such, a user recognition-based control system provides convenience to a user USER by analyzing whether the user USER has an intent to use and automatically controlling an electronic device without user manipulation.

Figure 18:
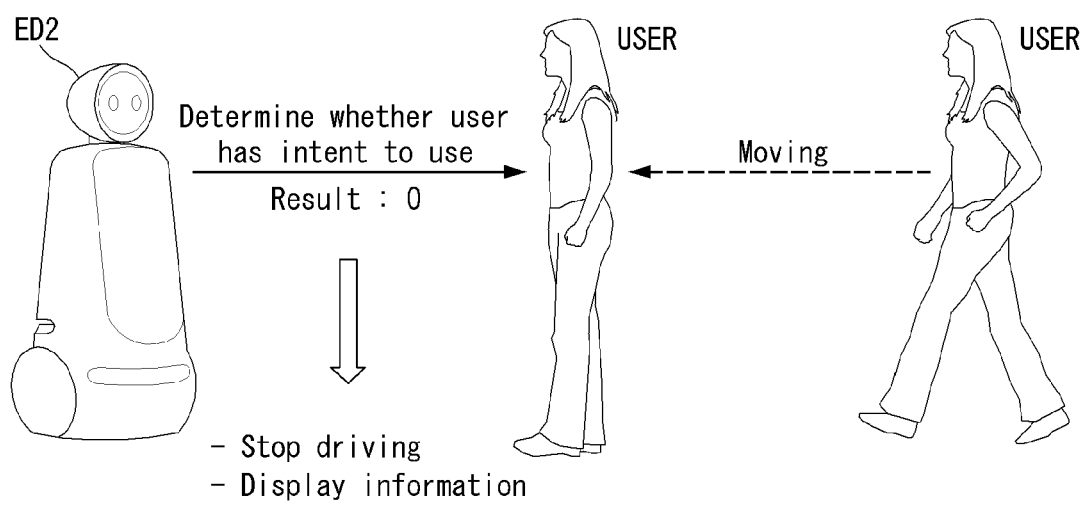
FIGS. 18 to 20 are views depicting an example of an airport robot applied to an exemplary embodiment of the present disclosure.
Figure 19:
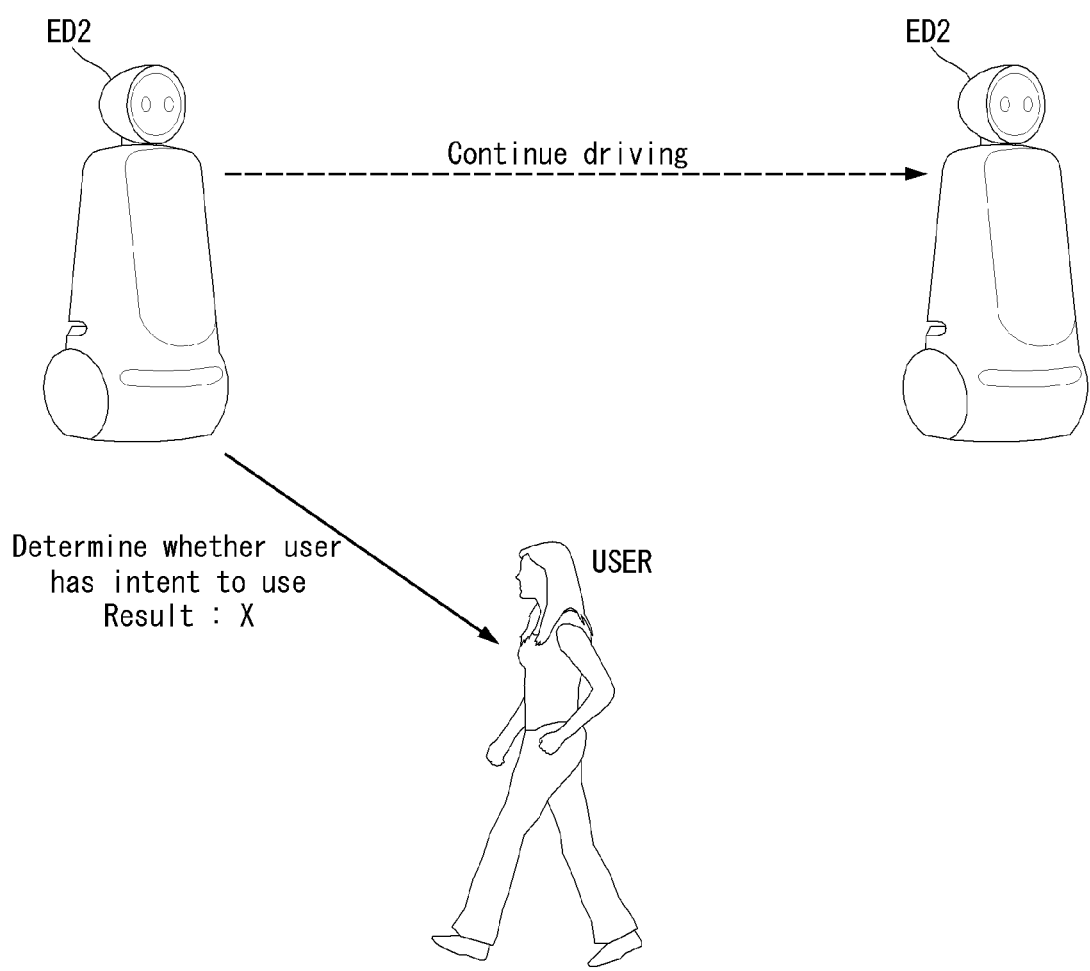
Figure 20:
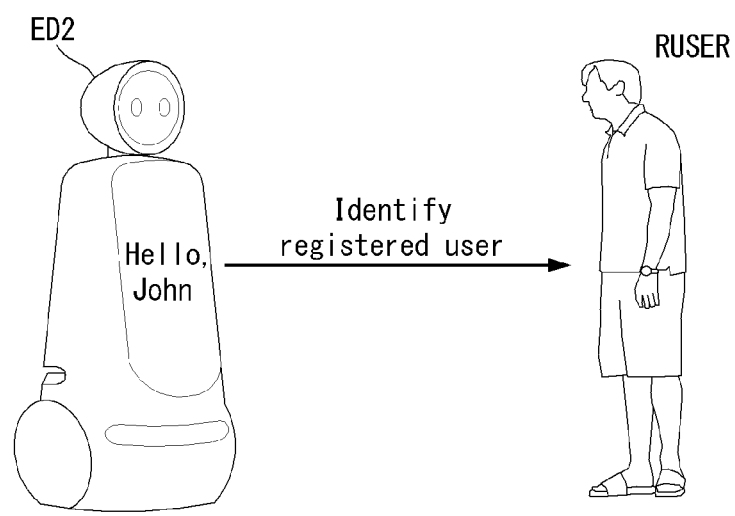

FIGS. 18 to 20 are views depicting an example of an airport robot applied to an exemplary embodiment of the present disclosure.

A user recognition-based control method according to an exemplary embodiment of the present disclosure also may be applied to an airport robot. Meanwhile, since the airport robot generally comes with a driving function, in addition to the information display function of the TV described above with reference to FIGS. 15 to 17, the user recognition-based control method of the present disclosure may apply equally to the driving function as well as the information display function. Hereinafter, the technical characteristics described above with reference to FIGS. 18 to 20 will be described in specific details.

Referring to FIG. 18, an airport robot ED2 may capture an image including a user USER. The airport robot may transmit the captured image to the server (220 of FIG. 6) for the analysis of the user USER's motion features and/or gaze features.

In this case, the server (220 of FIG. 6) may determine whether the user USER has an intent to use by analyzing the received image. In an example, if the user USER comes closer toward the airport robot ED2, the server (200 of FIG. 6) may predict that the user USER has an intent to use.

Specifically, the server (220 of FIG. 6) may apply an image of an approaching user USER to a trained first classification model and produce a first output of the first classification model.

Also, the server (220 of FIG. 6) may determine that the user USER's behavior is an access from the user USER with intent to use or an access from the user USER with no intent to use.

Once it is determined that the user USER has an intent to use through the analysis of the image, the server (220 of FIG. 6) may generate a signal for controlling the airport robot ED2 to stop driving and turn on its information display function. In contrast, once it is determined that the user USER has no intent to use through the analysis of the image, the server (220 of FIG. 6) may generate a signal for controlling the airport robot ED2 to continue driving and turn off its information display function.

In an example, if the user USER comes closer toward the airport robot ED2 and stops in front of the airport robot ED2, the server (220 of FIG. 6) may determine that the approaching user USER wants to get information provision service from the airport robot ED2. That is, the server (220 of FIG. 6) may identify the approaching user USER as a user USER having an intent to use.

Meanwhile, referring to FIG. 19, if the user USER does not come closer toward the airport robot ED2 but just walks past the side of the airport robot ED2, the server (220 of FIG. 6) may determine that the user USER has no intent to use. More specifically, the first output produced by applying the user USER's motion features to a trained first classification model has a value closer to a label with no intent to use, compared to the example of implementation of FIG. 18 in which the user USER walks toward the airport robot ED2 and stops in front of it. In this case, the server (220 of FIG. 16) may generate a signal for controlling the airport robot ED2 to turn off its information display function and continue driving and transmit it to the airport robot ED2.

As such, by controlling the driving and/or information display function of the airport robot ED2, the airport robot ED2 may overcome problems caused by erroneous recognition of the user USER, such as reckless information provision and driving failures. More specifically, at airports where large numbers of users USER go by, multiple users USER may come closer toward the airport robot ED1, thus leading to erroneous recognition, such as stopping driving and displaying/outputting information each time a user USER goes past the airport robot ED2. In this case, an exemplary embodiment of the present disclosure may solve this problem by using at least one classification model.

Referring to FIG. 20, the server (220 of FIG. 6) may identify a registered user RUSER based on vision features included in an image or speech features included in a user USER's voice. In an example, the server (220 of FIG. 6) may analyze the motion features (e.g., skeleton information) of a user USER included in an image and identify a registered user RUSER, by using the differences in walking or sitting habits among individual users USER. In another example, the server (220 of FIG. 6) may identify a registered user RUSER based on gaze features including iris information of a user USER included in an image. In yet another example, the server (220 of FIG. 6) may identify a registered user RUSER based on a user USER's facial expressions or the accent, frequency, pitch, etc. of the user USER's voice. Notably, the server (220 of FIG. 6) may recognize a user USER through facial recognition by using a photograph of the user USER included in the user USER's reservation information.

As such, on the basis of the result of identification of a recognized registered user RUSER, the server (220 of FIG. 6) may provide optimized service to the registered user RUSER by means of the airport robot ED2. For example, in the case of a user USER pre-registered on the airport robot ED2, the registered user RUSER's flight reservation information may be displayed. The flight reservation information may comprise at least one among the gate number, departure time, and arrival time of the flight.

Meanwhile, if an identification result based on at least one classification model is erroneous, the server (220 of FIG. 6) may perform control such that information on the registered user RUSER is shown through a display. For example, the server (220 of FIG. 6) may transmit a signal for controlling the airport robot ED2 to display "Hello, Jane". In this case, if the user USER is not Jane, they may have the identification result modified by giving a voice input including an activation word toward the airport robot ED2. For example, if the user USER is not Jane but Susan, when Susan utters "Hi, LG" toward the airport robot ED2, the airport robot ED2 may modify the identification result based on motion features or gaze features, on the basis of a voice recognition result corresponding to Susan. In an exemplary embodiment of the present disclosure, the activation word may be preset by the user USER when they make a flight reservation. That is, the activation word may be used as an encryption key for the user USER to ensure the security of personal information.

Figure 21:
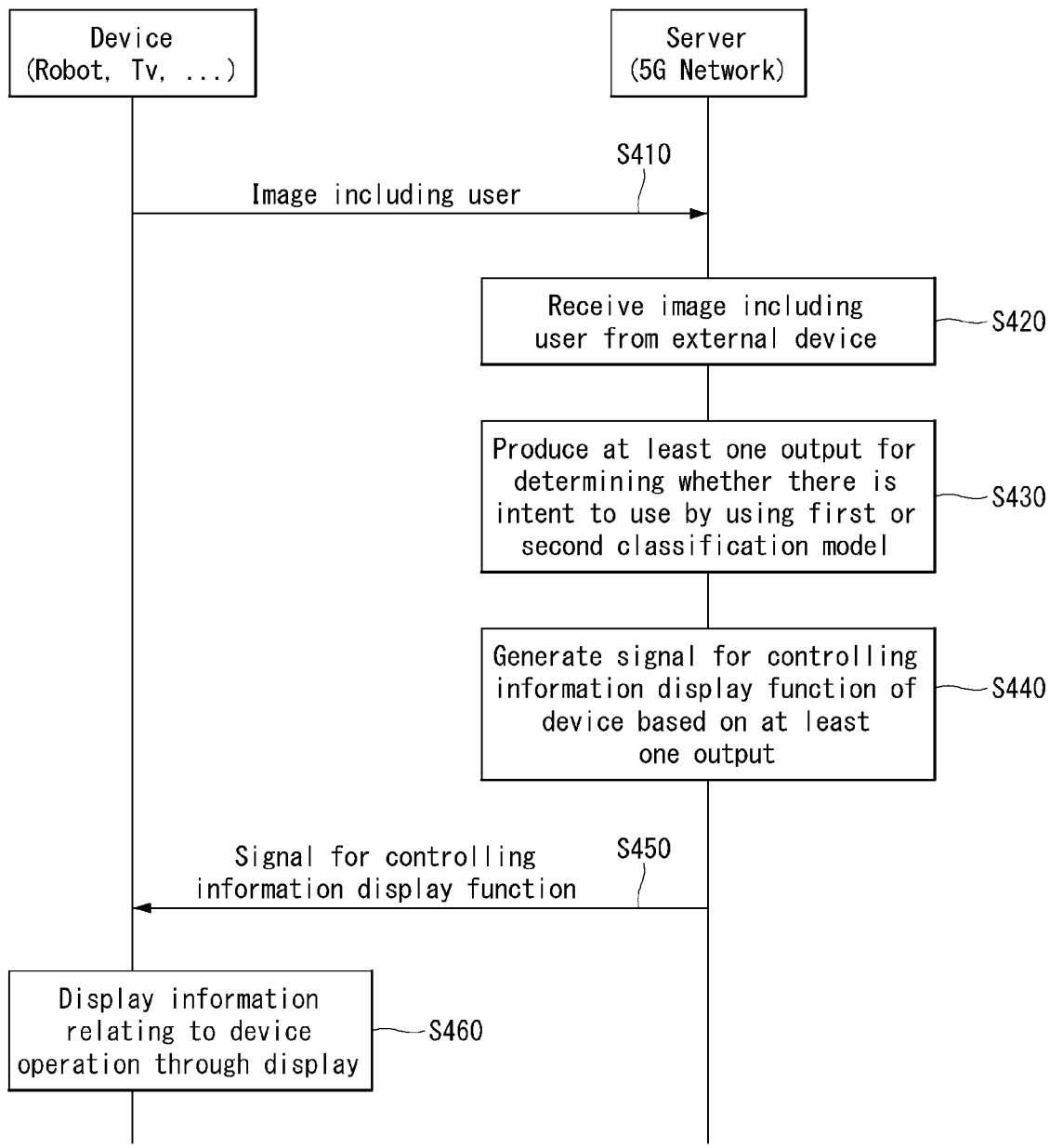
FIG. 21 is a sequence chart of a user recognition-based control method according to an exemplary embodiment of the present disclosure.

FIG. 21 is a sequence chart of a user recognition-based control method according to an exemplary embodiment of the present disclosure. For details of the control method, a description will be given with a focus on the transmission and reception of information between an external device and a server, but redundancies with what has been described with reference to FIGS. 7 to 9 will be omitted.

An external device 100 including a robot, TV, etc. may transmit to the server (220 of FIG. 6) an image including a user captured through a camera (S410).

The server (220 of FIG. 6) may receive the image including the user from the external device 100 and produce at least one output for determining whether there is an intent to use by using a first or second classification model (S420 and S430).

The server (220 of FIG. 6) may generate a signal for controlling an information display function of the device 100 based on the at least one output (S440).

The server (220 of FIG. 6) may control various operations of the external device 100 by transmitting the signal for controlling the information display function to the external device 100 (S450).

Meanwhile, a user recognition-based control method according to another exemplary embodiment of the present disclosure may be implemented in an on-device 100 process, without communicating with the server (220 of FIG. 6) or a 5G network. In an example, the external device 100 does not transmit an image including a user to the server (220 of FIG. 6) but instead may perform AI processing within the external device 100. More specifically, the external device 100 may apply a captured image to a trained first or second classification model and produce at least one output for determining whether there is an intent to use. Here, the external device 100 may determine whether the user has an intent to use or not, based on the at least one produced output. If the user has an intent to use, the external device 100 may turn on the information display function, and, if the user has no intent to use, the external device 100 may turn off the information display function.

The above-described present invention can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g., transmission over the internet). Accordingly, the above detailed description should not be construed in all aspects as limiting, and be considered illustrative. The scope of the present invention should be determined by rational interpretation of the appended claims, and all changes within the equivalent range of the present invention are included in the scope of the present invention.

The advantageous effects of a device control method based on user recognition and a device therefor according to an exemplary embodiment of the present disclosure are as follows:

One advantage of the present disclosure is to determine whether there is an intent to use based on a user's motion or gaze.

Another advantage of the present disclosure is to reduce unnecessary power consumption by turning off an information display function if it is determined that the user has no intent to use.

Another advantage of the present disclosure is to identify a registered user by using a vision-based identification model.

Another advantage of the present disclosure is to identify a user based on a speaker's voice and modify vision-based identification results by using voice-based identification results.

Another advantage of the present disclosure is to provide various content preferred by an identified user based on information on the identified user.

Effects which can be acquired by the disclosure are not limited to the above described effects, and other effects that have not been mentioned may be clearly understood by those skilled in the art from the following description.

What is claimed is:

1. An artificial intelligence-based control method comprising:
when a user approaches within a preset sensing range of a device, receiving an image including the user from the device;
generating a first feature vector representing motion features from the image;
producing a first output for determining whether there is an intent to use the device by applying the first feature vector to a first classification model;
based on a determination that there is the intent to use the device according to the first output, generating a second feature vector representing gaze features from the image and producing a second output for determining whether there is the intent to use the device by applying the second feature vector to a second classification model;
generating and transmitting a signal for controlling the device to turn on or off an information display function, wherein an on signal for controlling the device to turn on the information display function is generated and transmitted based on a determination that there is intent to use the device according to the first output and wherein an off signal for controlling the device to turn off the information display function is generated and transmitted based on a determination that there is no intent to use the device according to the second output;
identifying a registered user based on vision features of the user including at least one among the motion features, facial expressions, and the gaze features;
receiving a voice of the user;
generating a third feature vector representing speech features from the voice;
identifying a speaker having a most similar speech feature among a plurality of registered speakers by applying the third feature vector to a speaker identification model;
based on an identification result based on the vision features and an identification result based on the speech features being different, modifying user information labeled with the vision features in such a way as to be mapped to user information identified based on the speech features,
wherein the first output has a different value for each registered user.

2. The method of claim 1, wherein the first and second classification models are convolutional neural network-based learning models.

3. The method of claim 1, wherein the gaze features comprise at least one among a direction of gaze of the user, an amount of time the user looks at the device, and an angle between a camera placed in the device and irises.

4. The method of claim 1, wherein the motion features comprise at least one of either a moving pattern or walking speed based on a skeleton of the user.

5. The method of claim 1, further comprising generating a signal for performing control such that preferred content based on a registered history of use of the identified user is shown through a display.

6. The method of claim 1, wherein the sensing range is an angle of view of a camera provided in the device.

7. The method of claim 1, wherein the device is either a TV or an airport robot.

8. An intelligent device comprising:
a communication module;
a sensor configured to sense an access of a user; and
a processor configured to:
when the user approaches within a preset sensing range of the sensor, receive an image including the user from the device,
generate a first feature vector representing motion features from the image,
produce a first output for determining whether there is an intent to use the device by applying the first feature vector to a first classification model,
based on a determination that there is the intent to use the device according to the first output, generate a second feature vector representing gaze features from the image and produce a second output for determining whether there is the intent to use the device by applying the second feature vector to a second classification model,
generate and transmit a signal for controlling the device to turn on or off an information display function, wherein an on signal for controlling the device to turn on the information display function is generated and transmitted based on a determination that there is intent to use the device according to the first output and wherein an off signal for controlling the device to turn off the information display function is generated and transmitted based on a determination that there is no intent to use the device according to the second output,
identify a registered user based on vision features of the user including at least one among the motion features, facial expressions, and the gaze features,
receive a voice of the user,
generate a third feature vector representing speech features from the voice,
identify a speaker having a most similar speech feature among a plurality of registered speakers by applying the third feature vector to a speaker identification model, and
based on an identification result based on the vision features and an identification result based on the speech features being different, modify user information labeled with the vision features in such a way as to be mapped to user information identified based on the speech features,
wherein the first output has a different value for each registered user.

9. The intelligent device of claim 8, wherein the first and second classification models are convolutional neural network-based learning models.

10. The intelligent device of claim 8, wherein the gaze features comprise at least one among a direction of gaze of the user, an amount of time the user looks at the device, and an angle between a camera placed in the device and irises.

11. The intelligent device of claim 8, wherein the motion features comprise at least one of either a moving pattern or walking speed based on a skeleton of the user.

12. The intelligent device of claim 8, wherein the processor is further configured to generate a signal for performing control such that preferred content based on a registered history of use of the identified user is shown through a display.

* * * * *